(12) United States Patent
Wang et al.

(10) Patent No.: US 12,019,215 B2
(45) Date of Patent: Jun. 25, 2024

(54) OPTICAL IMAGING SYSTEM

(71) Applicant: ZHEJIANG SUNNY OPTICS CO., LTD., Zhejiang (CN)

(72) Inventors: Xiaofang Wang, Zhejiang (CN); Kaiyuan Zhang, Zhejiang (CN); Fujian Dai, Zhejiang (CN); Liefeng Zhao, Zhejiang (CN)

(73) Assignee: ZHEJIANG SUNNY OPTICAL CO., LTD, Zhejiang (CN)

( * ) Notice: Subject to any disclaimer, the term of this patent is extended or adjusted under 35 U.S.C. 154(b) by 755 days.

(21) Appl. No.: 17/152,818

(22) Filed: Jan. 20, 2021

(65) Prior Publication Data

US 2021/0263285 A1    Aug. 26, 2021

(30) Foreign Application Priority Data

Feb. 20, 2020   (CN) .......................... 202010110933.1

(51) Int. Cl.
| | | |
|---|---|---|
| *G02B 13/00* | (2006.01) | |
| *G02B 9/64* | (2006.01) | |
| *G02B 27/00* | (2006.01) | |

(52) U.S. Cl.
CPC ........... *G02B 13/0045* (2013.01); *G02B 9/64* (2013.01); *G02B 27/0025* (2013.01)

(58) Field of Classification Search
CPC ..... G02B 9/64; G02B 13/0045; G02B 27/002
See application file for complete search history.

(56) References Cited

FOREIGN PATENT DOCUMENTS

| WO | WO-2019091170 A1 | * | 5/2019 | ............. G02B 13/00 |
| WO | WO-2020029620 A1 | * | 2/2020 | ......... G02B 13/0015 |

\* cited by examiner

*Primary Examiner* — Collin X Beatty
(74) *Attorney, Agent, or Firm* — Samson G. Yu

(57) ABSTRACT

The disclosure provides an optical imaging system, sequentially including a first lens, a second lens, a third lens, a fourth lens, a fifth lens, a sixth lens, a seventh lens and an eighth lens from an object side to an image side along an optical axis, wherein an image-side surface of the seventh lens is a concave surface; the optical imaging system meets the following conditional expressions: TTL/ImgH<1.3, f/EPD<1.8, ImgH>6 mm and 0<R15/f8<0.8, wherein TTL is a distance from an object-side surface of the first lens to an imaging surface of the optical imaging system on the optical axis; ImgH is a half of diagonal length of an effective pixel region on the imaging surface; f is a total effective focal length of the optical imaging system; EPD is an entrance pupil diameter of the optical imaging system.

19 Claims, 15 Drawing Sheets

OPTICAL IMAGING SYSTEM

CROSS-REFERENCE TO RELATED DISCLOSURES

The application claims priority to Chinese Patent Disclosure No. 202010110933.1, filed to the National Intellectual Property Administration, PRC (CNIPA) on Feb. 20, 2020, the disclosure of which is hereby incorporated by reference in its entirety.

TECHNICAL FIELD

The disclosure relates to the field of optical elements, and more particularly to an optical imaging system.

BACKGROUND

In recent years, with the upgrading and updating of portable electronic products and the development of image software functions and video software functions in the portable electronic products, the market demands for optical imaging systems applicable to the portable electronic products are gradually increased. Camera modules are usually arranged on portable devices such as mobile phones so that the mobile phones have camera functions. A charge-coupled device (CCD) type image sensor or a complementary metal oxide semiconductor (CMOS) type image sensor is usually arranged in the camera module; and the optical imaging system is provided. The optical imaging system can collapse light on an object side; and the imaging light travels along an optical path of the optical imaging system and irradiates the image sensor, so that the image sensor converts an optical signal into an electrical signal to form image data.

However, due to the trend of miniaturization of the portable electronic products, the increasingly strict requirements on a total length of camera modules cause a decrease in design freedom and an increase in design difficulty. With the performance improvement and size reduction of the CCD type image sensor and the CMOS type image sensor, correspondingly higher requirements are proposed to the camera modules. To meet, the requirement of miniaturization, an F number (Fno) of 2.0 or more is usually configured for the optical imaging system, but such an optical imaging system fails to meet higher-order imaging requirements.

To meet the requirements of miniaturization and imaging, an optical imaging system with the consideration of both miniaturization and large aperture and the advantages of ultrathin shape and high imaging quality is needed.

SUMMARY

Some embodiments of the disclosure provides an optical imaging system, which is applicable to portable electronic products and capable of at least solving or partially solving at least one of the above disadvantages in the related art.

In an embodiment of the disclosure provides an optical imaging system, sequentially including a first lens, a second lens, a third lens, a fourth lens, a fifth lens, a sixth lens, a seventh lens and an eighth lens from an object side to an image side along an optical axis, wherein an image-side surface of the seventh lens is a concave surface; the optical imaging system meets the following conditional expressions: TTL/ImgH<1.3, f/EPD<1.8, ImgH>6 mm and 0<R15/f8<0.8, wherein TTL is a distance from an object-side surface of the first lens to an imaging surface of the optical imaging system on the optical axis; ImgH is a half of diagonal length of an effective pixel region on the imaging surface; f is a total effective focal length of the optical imaging system; EPD is an entrance pupil diameter of the optical imaging system; R15 is a curvature radius of an object-side surface of the eighth lens; and f8 is an effective focal length of the eighth lens.

In an embodiment, at least one of the surfaces from the object-side surface of the first lens to an image-side surface of the eighth lens is an aspherical mirror surface.

In an embodiment, the optical imaging system provided by the disclosure can meet a conditional expression: 0.4<SAG61/SAG72<1.0, wherein SAG61 is an on-axis distance from an intersection point of an object-side surface of the sixth lens and the optical axis to an effective radius vertex of the object-side surface of the sixth lens on the optical axis; and SAG72 is an on-axis distance from an intersection point of the image-side surface of the seventh lens and the optical axis to an effective radius vertex of the image-side surface of the seventh lens on the optical axis.

In an embodiment, the optical imaging system provided by the disclosure can meet a conditional expression: −1.5<T78/SAG81<−0.5, wherein T78 is a separation distance between the seventh lens and the eighth lens on the optical axis; and SAG81 is an on-axis distance from an intersection point of the object-side surface of the eighth lens and the optical axis to an effective radius vertex of the object-side surface of the eighth lens on the optical axis.

In an embodiment, the optical imaging system provided by the disclosure can meet a conditional expression: −1.5<SAG42/CT4<−0.5, wherein SAG42 is an on-axis distance from an intersection point of an image-side surface of the fourth lens and the optical axis to an effective radius vertex of the image-side surface of the fourth lens on the optical axis; and CT4 is a central thickness of the fourth lens on the optical axis.

In an embodiment, the optical imaging system provided by the disclosure can meet a conditional expression: 0.5<ET7/(ET3+ET6)<1.0, wherein ET3 is an edge thickness of the third lens; ET6 is an edge thickness of the sixth lens; and ET7 is an edge thickness of the seventh lens.

In an embodiment, the optical imaging system provided by the disclosure can meet a conditional expression: 0.3<f78/f23<1.5, wherein f23 is a combined focal length of the second lens and the third lens; and f78 is a combined focal length of the seventh lens and the eighth lens.

In an embodiment, the first lens may have positive refractive power; the second lens may have negative refractive power; the seventh lens may have positive refractive power; and the eighth lens may have negative refractive power.

In an embodiment, the optical imaging system provided by the disclosure can meet a conditional expression: 0.5<(f8−f7)/(f241)<1.0, wherein f1 is an effective focal length of the first lens; f2 is an effective focal length of the second lens; f7 is an effective focal length of the seventh lens; and f8 is an effective focal length of the eighth lens.

In an embodiment, the object-side surface of the first lens may be a convex surface; and the image-side surface of the first lens may be a concave surface.

In an embodiment, the optical imaging system provided by the disclosure can meet a conditional expression: 0.5<f/(R2−R1)<1.0, wherein f is a total effective focal length of the optical imaging system; R1 is a curvature radius of the object-side surface of the first lens; and R2 is a curvature radius of an image-side surface of the first lens.

In an embodiment, an object-side surface of the second lens may be a convex surface; and an image-side surface of the second lens may be a concave surface.

In an embodiment, the optical imaging system provided by the disclosure can meet a conditional expression: $0.3<R4/R3<0.8$, wherein R3 is a curvature radius of an object-side surface of the second lens; and R4 is a curvature radius of an image-side surface of the second lens.

In an embodiment, an object-side surface of the sixth lens may be a convex surface; and $0.3<R11/|R12|<1.5$, wherein R11 is a curvature radius of the object-side surface of the sixth lens, and R12 is a curvature radius of an image-side surface of the sixth lens.

In an embodiment, an object-side surface of the third lens may be a convex surface, and an image-side surface of the third lens may be a concave surface; and an object-side surface of the seventh lens may be a convex surface, and the image-side surface of the seventh lens may be a concave surface.

In an embodiment, the optical imaging system provided by the disclosure can meet a conditional expression: $0.3<(R5+R6)/(R13+R14)<1.0$, wherein R5 is a curvature radius of an object-side surface of the third lens; R6 is a curvature radius of an image-side surface of the third lens; R13 is a curvature radius of an object-side surface of the seventh lens; and R14 is a curvature radius of the image-side surface of the seventh lens.

In an embodiment, the optical imaging system provided by the disclosure can meet a conditional expression: $0.2<R9/(R9+R10)<0.9$, wherein R9 is a curvature radius of an object-side surface of the fifth lens; and R10 is a curvature radius of an image-side surface of the fifth lens.

In an embodiment, the optical imaging system provided by the disclosure can meet a conditional expression: $0.4<T67/CT1<1.0$, wherein T67 is a separation distance between the sixth lens and the seventh lens on the optical axis; and CT1 is a central thickness of the first lens on the optical axis.

In an embodiment, the optical imaging system provided by the disclosure can meet a conditional expression: $0.3<(CT2+CT3+CT5)/(CT6+CT7+CT8)<0.8$, wherein CT2 is a central thickness of the second lens on the optical axis; CT3 is a central thickness of the third lens on the optical axis; CT5 is a central thickness of the fifth lens on the optical axis; CT6 is a central thickness of the sixth lens on the optical axis; CT7 is a central thickness of the seventh lens on the optical axis; and CT8 is a central thickness of the eighth lens on the optical axis.

In an embodiment, the optical imaging system provided by the disclosure can meet a conditional expression: $0.2<(T12+T23)/(T34+T45+T56)<0.7$, wherein T12 is a separation distance between the first lens and the second lens on the optical axis; T23 is a separation distance between the second lens and the third lens on the optical axis; and T34 is a separation distance between the third lens and the fourth lens on the optical axis; T45 is a separation distance between the fourth lens and the fifth lens on the optical axis; and T56 is a separation distance between the fifth lens and the sixth lens on the optical axis.

In an embodiment, an object-side surface of the eighth lens is a concave surface; and an image-side surface of the eighth lens is a concave surface.

In another embodiment, the optical imaging system provided by the disclosure sequentially includes a first lens, a second lens, a third lens, a fourth lens, a fifth lens, a sixth lens, a seventh lens and an eighth lens from an object side to an image side along an optical axis, wherein an image-side surface of the seventh lens is a concave surface; the optical imaging system meets the following conditional expressions: $TTL/ImgH<1.3$, $f/EPD<1.8$, $ImgH>6$ mm and $0.3<f78/f23<1.5$, wherein TTL is a distance from an object-side surface of the first lens to an imaging surface of the optical imaging system on the optical axis; ImgH is a half of diagonal length of an effective pixel region on the imaging surface; f is a total effective focal length of the optical imaging system; EPD is an entrance pupil diameter of the optical imaging system; f78 is a combined focal length of the seventh lens and the eighth lens; and f23 is a combined focal length of the second lens and the third lens.

Eight lenses are adopted in the disclosure; and the optical imaging system has at least one beneficial effect of miniaturization, large aperture, ultrathin shape, high imaging quality and the like by reasonably distributing the refractive power, the surface type and the central thickness of each lens as well as the distance between the lenses on the optical axis.

BRIEF DESCRIPTION OF THE DRAWINGS

Other characteristics, purposes and advantages of the disclosure will become more apparent through the following detailed description of non-restrictive embodiments in combination with the accompanying drawings. In the accompanying drawings.

DETAILED DESCRIPTION OF THE EMBODIMENTS

Figure 1:
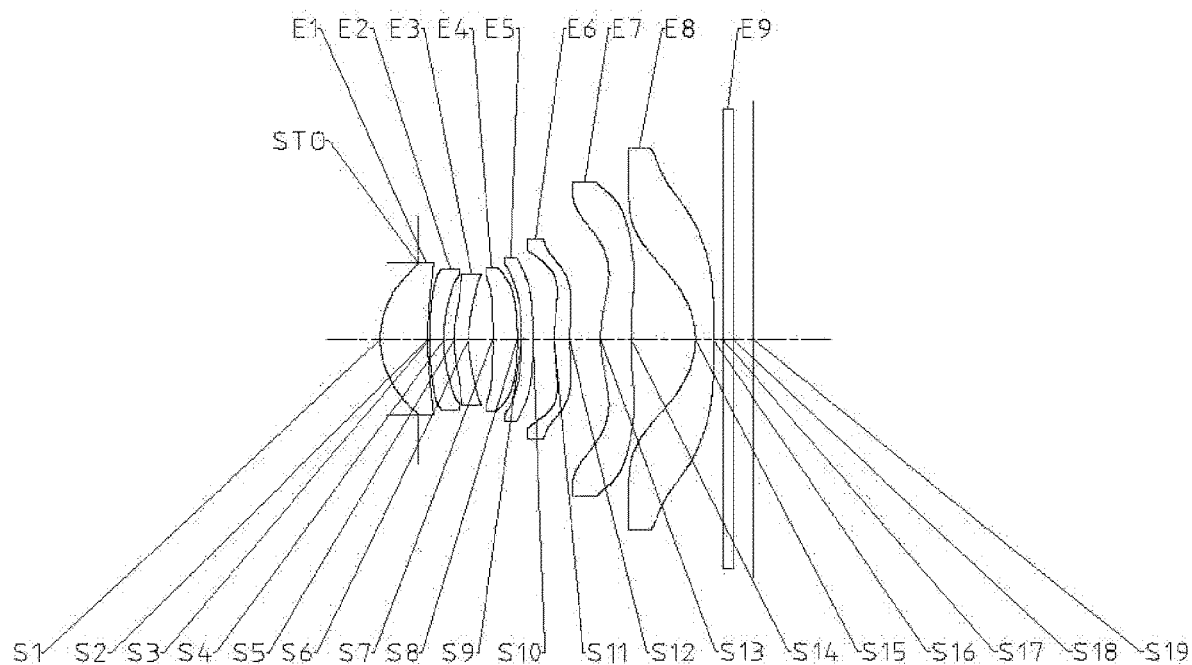
FIG. 1 shows a structure diagram of an optical imaging system according to Embodiment 1 of the disclosure.

For a better understanding of the disclosure, various aspects of the disclosure will be described in more detail with reference to the accompanying drawings. It should be understood that the detailed descriptions are only descriptions for exemplary embodiments of the disclosure, rather than restrictions for the scope of the disclosure in any way. The same reference numerals refer to the same elements throughout the specification. The expression "and/or" includes any and all combinations of one or more of the associated listed items.

It is to be noted that, in the specification, expressions like first, second and third are adopted not to represent any restriction to characteristics but only to distinguish one characteristic from another characteristic. Therefore, a first lens discussed below may also be called a second lens or a third lens under the condition of not departing from the teachings of the disclosure.

In the drawings, the thickness, size and shape of the lens have been slightly exaggerated for ease illustration. In particular, a spherical shape or an aspherical shape shown in the drawings is shown by some embodiments. That is, the spherical shape or the aspherical shape is not limited to the spherical shape or the aspherical shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if the lens surface is a concave surface and a position of the concave surface is not defined, it indicates that the lens surface is a concave surface at least in the paraxial region. A surface of each lens closest to an object-side is called an object-side surface of the lens, and a surface of each lens closest to an imaging surface is called an image-side surface of the lens.

It also should be understood that terms "include", "including", "have", "contain" and/or "containing", used in this description, represent existence of a stated feature, component and/or part but do not exclude existence or addition of one or more other features, components and parts and/or combinations thereof. In addition, expressions like "at least one in . . . " may appear after a list of listed features not to modify an individual component in the list but to modify the listed features. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by the general technical personnel in the field of the disclosure. It also should be understood that the terms (for example, terms defined in a common dictionary) should be explained to have meanings consistent with the meanings in the context of correlation technique and cannot be explained with ideal or excessively formal meanings, unless clearly defined like this in the disclosure.

It should be noted that the embodiments in the disclosure and features in the embodiments can be combined without conflicts. The disclosure will be described below with reference to the drawings and in combination with the embodiments in detail.

The features, principles and other aspects of the disclosure will be described below in detail.

An optical imaging system according to an exemplary embodiment of the disclosure may include, e.g., eight lenses with refractive power, i.e., a first lens, a second lens, a third lens, a fourth lens, a fifth lens, a sixth lens, a seventh lens and an eighth lens. The eight lenses are sequentially arranged from an object side to an image side along an optical axis. In the first lens to the eighth lens, an air space may exist between any two adjacent lenses.

In an exemplary embodiment, an image-side surface of the seventh lens may be a concave surface.

In an exemplary embodiment, the first lens has positive refractive power; an object-side surface of the first lens may be a convex surface; and an image-side surface of the first lens may be a concave surface.

In an exemplary embodiment, the second lens has negative refractive power; an object-side surface of the second lens may be a convex surface; and an image-side surface of the second lens may be a concave surface.

In an exemplary embodiment, an object-side surface of the third lens may be a convex surface; and an image-side surface of the third lens may be a concave surface.

In an exemplary embodiment, an object-side surface of the sixth lens may be a convex surface.

In an exemplary embodiment, the seventh lens has positive refractive power; and an object-side surface of the seventh lens may be a convex surface.

In an exemplary embodiment, the eighth lens has negative refractive power; an object-side surface of the eighth lens may be a concave surface; and an image-side surface of the eighth lens may be a concave surface.

By reasonably controlling the positive and negative distribution of the refractive power of each component of the system and the curvatures of the surface types of the lenses, the low-order aberration of the system can be effectively balanced and controlled, which is beneficial to maintain the miniaturization of the system.

In an exemplary embodiment, a curvature radius R15 of the object-side surface of the eighth lens and an effective focal length f8 of the eighth lens can meet $0<R15/f8<0.8$. The tolerance sensitivity of the optical imaging system can be reduced better by controlling the conditional expression. More specifically, the optical imaging system can meet a conditional expression: $0.55<R15/f8<0.77$.

In an exemplary embodiment, a total effective focal length f of the optical imaging system and an entrance pupil diameter (EPD) of the optical imaging system can meet $f/EPD<1.8$. By controlling a ratio of the total effective focal length to the entrance pupil diameter, the optical imaging system has the advantage of larger aperture, thereby increasing a luminous flux of the system and enhancing the imaging effect of the system in a dark environment. More specifically, the optical imaging system can meet a conditional expression: $f/EPD<1.71$.

In an exemplary embodiment, TTL is a distance from the object-side surface of the first lens to an imaging surface of the optical imaging system on the optical axis, ImgH is a half of a diagonal length of an effective pixel region on the imaging surface, TTL and ImgH meet $TTL/ImgH<1.3$. By controlling a ratio of a total optical length to an image height, the size of the optical imaging system can be better controlled. More specifically, the optical imaging system of the disclosure can meet a conditional expression: $1.2<TTL/ImgH<1.3$.

In an exemplary embodiment, the optical imaging system can meet a conditional expression: $ImgH>6$ mm. The optical imaging system has the characteristic of high pixel, which can effectively improve the resolving power of the optical imaging system. More specifically, the optical imaging system of the disclosure can meet a conditional expression: $ImgH>6.2$ mm.

Exemplarily, the optical imaging system can meet the following conditional expressions: $TTL/ImgH<1.3$, f/EPD<1.8, ImgH>6 mm and 0<R15/f8<0.8. The optical imaging system has the characteristics of miniaturization, large aperture, ultrathin shape and high imaging quality.

In an exemplary embodiment, a distance SAG61 from an intersection point of an object-side surface of the sixth lens and the optical axis to an effective radius vertex of the object-side surface of the sixth lens on the optical axis and a distance SAG72 from an intersection point of the image-side surface of the seventh lens and the optical axis to an effective radius vertex of the image-side surface of the seventh lens on the optical axis can meet 0.4<SAG61/SAG72<1.0. By controlling the range of the conditional expression, the shapes of the sixth lens and the seventh lens can be effectively controlled, the machinability of the two lenses can be improved, and the direction of light at an edge field of view of the optical imaging system can be effectively controlled, so that the system can be better matched with an imaging chip. More specifically, the optical imaging system can meet a conditional expression: 0.5<SAG61/SAG72<0.9.

In an exemplary embodiment, a separation distance T78 between the seventh lens and the eighth lens on the optical axis and a distance SAG81 from an intersection point of the object-side surface of the eighth lens and the optical axis to an effective radius vertex of the object-side surface of the eighth lens on the optical axis meet−1.5<T78/SAG81<−0.5. By controlling the conditional expression, the contribution of the seventh lens and the eighth lens to a field curvature of the system can be effectively reduced, so that the optical imaging system has a higher image quality. More specifically, the optical imaging system can meet a conditional expression: −1.10<T78/SAG81<−0.55.

In an exemplary embodiment, a distance SAG42 from an intersection point of an image-side surface of the fourth lens and the optical axis to an effective radius vertex of the image-side surface of the fourth lens on the optical axis and a central thickness CT4 of the fourth lens on the optical axis can meet−1.5<SAG42/CT4<−0.5. By controlling the conditional expression, the shape of the fourth lens can be better controlled, which is beneficial to the moulding and machining of the fourth lens, thereby improving the image quality and yield of the optical imaging system. More specifically, the optical imaging system can meet a conditional expression: −1.15<SAG42/CT4<−0.60.

In an exemplary embodiment, an edge thickness ET3 of the third lens, an edge thickness ET6 of the sixth lens and an edge thickness ET7 of the seventh lens can meet 0.5<ET7/(ET3+ET6)<1.0. By controlling the conditional expression, the edge thicknesses of the third lens, the sixth lens and the seventh lens can be effectively controlled, the machinability of each lens can be improved, the molding of the lens is facilitated, and the image quality of the edge field of view of the optical imaging system can be ensured at the same time. More specifically, the optical imaging system can meet a conditional expression: 0.60<ET7/(ET3+ET6)<0.88

In an exemplary embodiment, a combined focal length f23 of the second lens and the third lens and a combined focal length f78 of the seventh lens and the eighth lens can meet 0.3<f78/f23<1.5. By controlling the conditional expression, the refractive power of the optical imaging system can be reasonably distributed, and the field curvature of the system can be reasonably controlled and restrained within a certain range. More specifically, the optical imaging system can meet a conditional expression: 0.35<f78/f23<1.40.

In an exemplary embodiment, an effective focal length f1 of the first lens, an effective focal length f2 of the second lens, an effective focal length f7 of the seventh lens and an effective focal length f8 of the eighth lens can meet 0.5<(f8−f7)/(f2−f1)<1.0. By controlling the conditional expression, the refractive power of four lenses nearby the object side and four lenses nearby the image side can be reasonably distributed, and the astigmatism of the optical imaging system can be effectively controlled, so that the astigmatism produced by the four lenses nearby the object side and the astigmatism produced by the four lenses nearby the image side can cancel out each other, and the optical imaging system can obtain higher imaging quality. More specifically, the optical imaging system can meet a conditional expression: 0.55<(f8−f7)/(f2−f1)<88.

In an exemplary embodiment, a total effective focal length f of the optical imaging system, a curvature radius R1 of the object-side surface of the first lens, and a curvature radius R2 of the image-side surface of the first lens can meet 0.5<f/(R2−R1)<1.0. By controlling the conditional expression, the shape of the first lens can be effectively controlled, and the contribution of the first lens to the higher-order aberration can be reduced, so that the optical imaging system has better resolving power. More specifically, the optical imaging system can meet a conditional expression: 0.55<f/(R2−R1)<0.90.

In an exemplary embodiment, a curvature radius R3 of the object-side surface of the second lens and a curvature radius R4 of the image-side surface of the second lens can meet 0.3<R4/R3<0.8. By controlling a ratio of curvature radii of two mirror surfaces of the second lens, the shape of the second lens can be effectively controlled, and the aberration of the optical imaging system can be easily balanced, thereby improving the imaging quality of the optical imaging system, and further ensuring the machinability of the second lens so that the optical imaging system has a higher yield. More specifically, the optical imaging system can meet a conditional expression: 0.35<R4/R3<0.65.

In an exemplary embodiment, a curvature radius R11 of the object-side surface of the sixth lens and a curvature radius R12 of the image-side surface of the sixth lens can meet 0.3<R11/|R12|<1.5. By matching curvature radii of two mirror surfaces of the sixth lens, the shape of the sixth lens can be effectively controlled, a light angle of the edge field of view can be controlled within a reasonable range, and the sensitivity of the system can be effectively reduced. More specifically, the optical imaging system can meet a conditional expression: 0.40<R11/|R12|<1.40.

In an exemplary embodiment, a curvature radius R5 of the object-side surface of the third lens, a curvature radius R6 of the image-side surface of the third lens, a curvature radius R13 of the object-side surface of the seventh lens and a curvature radius R14 of the image-side surface of the seventh lens can meet 0.3<(R5+R6)/(R13+R14)<1.0. By matching curvature radii of two mirror surfaces of the third lens with those of the seventh lens, a spherical aberration produced by the third lens and the seventh lens can be effectively balanced, so that the system has a smaller spherical aberration, thereby improving the resolving power of the system. More specifically, the optical imaging system can meet a conditional expression: 0.35<(R5+R6)/(R13+R14)<0.80.

In an exemplary embodiment, a curvature radius R9 of the object-side surface of the fifth lens and a curvature radius R10 of the image-side surface of the fifth lens can meet 0.2<R9/(R9+R10)<0.9. By controlling the conditional expression, the shape of the fifth lens can be effectively controlled to effectively control the contribution of the fifth lens to the spherical aberration of the optical imaging system, so that the system has better resolving power. More specifically, the optical imaging system can meet a conditional expression: 0.25<R9/(R9+R10)<0.82.

In an exemplary embodiment, a separation distance T67 between the sixth lens and the seventh lens on the optical axis and a central thickness CT1 of the first lens on the optical axis can meet 0.4<T67/CT1<1.0. By controlling the conditional expression, the field curvature of the optical imaging system can be better controlled, and the resolving power of the optical imaging system can be improved. More specifically, the optical imaging system can meet a conditional expression: $0.42<T67/CT1<0.85$.

In an exemplary embodiment, a central thickness CT2 of the second lens on the optical axis, a central thickness CT3 of the third lens on the optical axis, a central thickness CT5 of the fifth lens on the optical axis, a central thickness CT6 of the sixth lens on the optical axis, a central thickness CT7 of the seventh lens on the optical axis and a central thickness CT8 of the eighth lens on the optical axis can meet $0.3<(CT2+CT3+CT5)/(CT6+CT7+CT8)<0.8$. By reasonably distributing the central thicknesses of the six lenses including the second lens, the third lens, the fifth lens, the sixth lens, the seventh lens and the eighth lens, the contribution of each lens to the field curvature of the optical imaging system can be better controlled, so that the optical imaging system has a smaller field curvature, thereby improving the performance of the optical imaging system. More specifically, the optical imaging system can meet a conditional expression: $0.55<(CT2+CT3+CT5)/(CT6+CT7+CT8)<0.70$.

In an exemplary embodiment, a separation distance T12 between the first lens and the second lens on the optical axis, a separation distance T23 between the second lens and the third lens on the optical axis, a separation distance T34 between the third lens and the fourth lens on the optical axis, a separation distance T45 between the fourth lens and the fifth lens on the optical axis and a separation distance T56 between the fifth lens and the sixth lens on the optical axis can meet $0.2<(T12+T23)/(T34+T45+T56)<0.7$. By controlling the first lens to the sixth lens, an air space between the lenses can be reasonably distributed, so that the system is compact; and meanwhile, the field curvature can be effectively controlled to ensure the field curvature of the system in a smaller range, thereby ensuring the imaging quality of the system. More specifically, the optical imaging system can meet a conditional expression: $0.20<(T12+T23)/(T34+T45+T56)<0.60$.

In an exemplary embodiment, the optical imaging system may further include at least one diaphragm. The diaphragm can be arranged at an appropriate position as required, e.g., between the object side and the first lens. Optionally, the optical imaging system may further include an optical filter configured to correct the chromatic aberration and/or protective glass configured to protect a photosensitive element located on the imaging surface.

The optical imaging system according to the above embodiments of the disclosure may use multiple lenses, for example, eight lenses. By reasonably distributing the refractive power of each lens, the surface type, the CT of each lens and the distance between the lenses on the optical axis, the volume of the imaging system can be effectively reduced, the sensitivity of the lens can be reduced, and the machinability of the lens can be improved, so that the optical imaging system is more conducive to production and machining and is applicable to portable electronic products. Meanwhile, the optical imaging system of the disclosure also has excellent optical properties of large aperture, ultra-thin shape and high imaging quality.

In the embodiments of the disclosure, at least one of mirror surfaces of each lens is an aspherical mirror surface, i.e., at least one of mirror surfaces from the object-side surface of the first lens to the image-side surface of the eighth lens is an aspherical mirror surface. The aspherical mirror surface has the characteristic that the curvature keeps changing from a centre of the lens to a periphery of the lens. Unlike a spherical lens with a constant curvature from the centre of the lens to the periphery of the lens, an aspherical lens has a better curvature radius characteristic and the advantages of improving distortion aberrations and improving astigmatism aberrations. With adoption of the aspherical lens, the aberrations during imaging may be eliminated as much as possible, thereby improving the imaging quality. Optionally, at least one of the object-side surface and the image-side surface of each of the first lens, the second lens, the third lens, the fourth lens, the fifth lens, the sixth lens, the seventh lens and the eighth lens is an aspherical mirror surface. Optionally, the object-side surface and the image-side surface of each of the first lens, the second lens, the third lens, the fourth lens, the fifth lens, the sixth lens, the seventh lens and the eighth lens are aspherical mirror surfaces.

However, those skilled in the art should know that the number of the lenses forming the optical imaging system may be changed without departing from the technical solutions claimed in the disclosure to achieve each result and advantage described in the specification. For example, although descriptions are made in the implementation mode with eight lenses as an example, the optical imaging system is not limited to eight lenses. If necessary, the optical imaging system may further include another number of lenses.

Specific embodiments of the optical imaging system applicable to the above implementation mode will be further described below with reference to the accompanying drawings.

Embodiment 1

An optical imaging system according to Embodiment 1 of the disclosure will be described below with reference to FIG. 1 to FIG. 2D. FIG. 1 shows a structure diagram of the optical imaging system according to Embodiment 1 of the disclosure.

As shown in FIG. 1, the optical imaging system sequentially includes a diaphragm STO, a first lens E1, a second lens E2, a third lens E3, a fourth lens E4, a fifth lens E5, a sixth lens E6, a seventh lens E7, an eighth lens E8 and an optical filter E9 from an object side to an image side along an optical axis.

The first lens E1 has positive refractive power; an object-side surface S1 of the first lens is a convex surface; and an image-side surface S2 of the first lens is a concave surface. The second lens E2 has negative refractive power; an object-side surface S3 of the second lens is a convex surface; and an image-side surface S4 of the second lens is a concave surface. The third lens E3 has positive refractive power; an object-side surface S5 of the third lens is a convex surface; and an image-side surface S6 of the third lens is a concave surface. The fourth lens E4 has positive refractive power; an object-side surface S7 of the fourth lens is a concave surface; and an image-side surface S8 of the fourth lens is a convex surface. The fifth lens E5 has negative refractive power; an object-side surface S9 of the fifth lens is a concave surface; and an image-side surface S10 of the fifth lens is a convex surface. The sixth lens E6 has positive refractive power; an object-side surface S11 of the sixth lens is a convex surface; and an image-side surface S12 of the sixth lens is a concave surface. The seventh lens E7 has positive refractive power; an object-side surface S13 of the seventh lens is a convex surface; and an image-side surface S14 of the seventh lens is a concave surface. The eighth lens E8 has a negative refractive power; an object-side surface S15 of the eighth lens is a concave surface; and an image-side surface S16 of the eighth lens is a concave surface. The optical filter E9 has an object-side surface S17 and an image-side surface S18. The optical imaging system has an imaging surface S19; and light from an object sequentially penetrates through the surfaces S1 to S18 and is finally imaged on the imaging surface S19.

Table 1 shows a list of basic parameters of the optical imaging system in Embodiment 1, in which the units of curvature radius, thickness/distance and focal length are millimetre (mm).

TABLE 1

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7917 | | | | |
| S1 | Aspherical | 2.7532 | 1.0000 | 1.55 | 56.1 | 6.23 | 1.9853 |
| S2 | Aspherical | 12.6340 | 0.0347 | | | | 1.9125 |
| S3 | Aspherical | 11.5239 | 0.3000 | 1.67 | 19.2 | −13.53 | 1.8426 |
| S4 | Aspherical | 5.0520 | 0.2177 | | | | 1.6643 |
| S5 | Aspherical | 4.2382 | 0.3000 | 1.67 | 20.4 | 100.13 | 1.6532 |
| S6 | Aspherical | 4.3976 | 0.5019 | | | | 1.7070 |
| S7 | Aspherical | −72.4877 | 0.5156 | 1.55 | 56.1 | 19.21 | 1.7741 |
| S8 | Aspherical | −9.1843 | 0.0879 | | | | 1.8771 |
| S9 | Aspherical | −8.3877 | 0.2350 | 1.67 | 20.4 | −20.88 | 1.9702 |
| S10 | Aspherical | −21.3533 | 0.4470 | | | | 2.1363 |
| S11 | Aspherical | 5.5667 | 0.3210 | 1.57 | 38.0 | 32.69 | 2.3317 |
| S12 | Aspherical | 7.7695 | 0.6607 | | | | 2.6155 |
| S13 | Aspherical | 4.3253 | 0.6407 | 1.55 | 56.1 | 10.18 | 3.6897 |
| S14 | Aspherical | 18.5089 | 1.3457 | | | | 4.0953 |
| S15 | Aspherical | −2.5681 | 0.3700 | 1.54 | 55.9 | −4.46 | 4.7079 |
| S16 | Aspherical | 37.3251 | 0.2021 | | | | 4.9881 |
| S17 | Spherical | Infinite | 0.2100 | 1.52 | 64.2 | | |
| S18 | Spherical | Infinite | 0.4300 | | | | |
| S19 | Spherical | Infinite | | | | | |

In Embodiment 1, the total effective focal length f of the optical imaging system is 6.71 mm; the F number Fno of the optical imaging system is 1.69; TTL is the distance from the object-side surface S1 of the first lens E1 to the imaging surface S19 on the optical axis, TTL is 7.82 mm; ImgH is the half of a diagonal length of an effective pixel region on the imaging surface S19, ImgH is 6.21 mm; and Semi-FOV is a half of the maximum field of view, Semi-FOV is 42.1°.

In Embodiment 1, the object-side surface and the image-side surface of any one of the first lens E1 to the eighth lens E8 are aspherical surfaces; and the surface type x of each aspherical lens can be defined by but not limited by the following aspherical formula:

$$x = \frac{ch^2}{1+\sqrt{1-(k+1)c^2h^2}} + \sum A_i h^i, \quad (1)$$

wherein x is the distance vector height from a vertex of the aspherical surface when the aspherical surface is at a height of h along the optical axis direction; c is a paraxial curvature of the aspherical surface, c=1/R (namely, the paraxial curvature c is a reciprocal of the curvature radius R in Table 1); k is the Conic coefficient; and Ai is an i-th-order correction coefficient of the aspherical surface. Table 2 shows the higher-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to each aspherical mirror surfaces S1 to S16 in Embodiment 1.

TABLE 2

| Surface number | A4 | A6 | A8 | A10 | A12 | A14 | A16 |
|---|---|---|---|---|---|---|---|
| S1 | −2.2447E−03 | 1.2955E−02 | −4.2882E−02 | 9.3015E−02 | −1.3900E−01 | 1.4724E−01 | −1.1229E−01 |
| S2 | −5.4713E−03 | −6.2029E−03 | 9.5910E−02 | −3.0998E−01 | 5.3665E−01 | −5.9512E−01 | 4.5266E−01 |
| S3 | −3.4068E−03 | −2.4051E−03 | 1.1057E−01 | −3.9785E−01 | 7.5166E−01 | −9.0737E−01 | 7.5013E−01 |
| S4 | −7.1505E−03 | 5.2532E−03 | 2.3730E−02 | −9.5810E−02 | 1.8842E−01 | −2.4825E−01 | 2.3835E−01 |
| S5 | −2.7678E−02 | −2.3009E−02 | 1.9070E−01 | −7.6551E−01 | 1.9033E+00 | −3.1786E+00 | 3.7019E+00 |
| S6 | −1.6689E−02 | −2.2264E−04 | −5.5504E−03 | 5.4356E−02 | −1.8985E−01 | 3.7026E−01 | −4.6002E−01 |
| S7 | −1.4048E−02 | 3.2409E−02 | −1.2411E−01 | 2.9080E−01 | −4.6477E−01 | 5.2344E−01 | −4.2466E−01 |
| S8 | 1.9054E−02 | −9.4458E−03 | −1.0327E−01 | 3.3205E−01 | −6.2060E−01 | 7.9067E−01 | −7.1676E−01 |
| S9 | 4.1548E−02 | −7.8564E−02 | 1.1197E−01 | −1.8459E−01 | 2.6098E−01 | −2.7577E−01 | 2.1136E−01 |

TABLE 2-continued

| | | | | | | | |
|---|---|---|---|---|---|---|---|
| S10 | 1.0048E-02 | -5.8529E-02 | 1.2523E-01 | -2.1690E-01 | 2.7070E-01 | -2.4053E-01 | 1.5378E-01 |
| S11 | -3.0490E-02 | -4.3531E-02 | 1.3356E-01 | -2.1935E-01 | 2.3886E-01 | -1.8297E-01 | 1.0083E-01 |
| S12 | -3.0839E-02 | -3.1931E-02 | 9.1715E-02 | -1.3147E-01 | 1.2256E-01 | -7.9073E-02 | 3.6181E-02 |
| S13 | -1.2823E-02 | -4.2686E-03 | 2.2309E-04 | 3.8790E-04 | -2.0873E-04 | 7.4195E-05 | -1.8360E-05 |
| S14 | 1.3531E-02 | -7.4917E-03 | 6.7050E-05 | 5.6233E-04 | -1.9095E-04 | 4.3175E-05 | -7.8723E-06 |
| S15 | -2.5833E-02 | 1.5954E-02 | -1.0085E-02 | 3.8425E-03 | -8.8786E-04 | 1.3477E-04 | -1.4078E-05 |
| S16 | -2.4942E-02 | 1.4397E-02 | -6.9564E-03 | 2.1223E-03 | -4.2342E-04 | 5.7983E-05 | -5.6097E-06 |

| Surface number | A18 | A20 | A22 | A24 | A26 | A28 | A30 |
|---|---|---|---|---|---|---|---|
| S1 | 6.2019E-02 | -2.4752E-02 | 7.0502E-03 | -1.3950E-03 | 1.8192E-04 | -1.4046E-05 | 4.8604E-07 |
| S2 | -2.4303E-01 | 9.2833E-02 | -2.5022E-02 | 4.6352E-03 | -5.5886E-04 | 3.9223E-05 | -1.2036E-06 |
| S3 | -4.3685E-01 | 1.8058E-01 | -5.2541E-02 | 1.0477E-02 | -1.3555E-03 | 1.0164E-04 | -3.3098E-06 |
| S4 | -1.7047E-01 | 9.0494E-02 | -3.5007E-02 | 9.5470E-03 | -1.7332E-03 | 1.8749E-04 | -9.1253E-06 |
| S5 | -3.0628E+00 | 1.8100E+00 | -7.5826E-01 | 2.1981E-01 | -4.1911E-02 | 4.7270E-03 | -2.3886E-04 |
| S6 | 3.8604E-01 | -2.2427E-01 | 9.0463E-02 | -2.4896E-02 | 4.4631E-03 | -4.7025E-04 | 2.2112E-05 |
| S7 | 2.5074E-01 | -1.0776E-01 | 3.3354E-02 | -7.2491E-03 | 1.0516E-03 | -9.1616E-05 | 3.6311E-06 |
| S8 | 4.6931E-01 | -2.2222E-01 | 7.5289E-02 | -1.7779E-02 | 2.7777E-03 | -2.5790E-04 | 1.0769E-05 |
| S9 | -1.1724E-01 | 4.7039E-02 | -1.3524E-02 | 2.7159E-03 | -3.6161E-04 | 2.8661E-05 | -1.0231E-06 |
| S10 | -7.1285E-02 | 2.3961E-02 | -5.7774E-03 | 9.7335E-04 | -1.0871E-04 | 7.2267E-06 | -2.1626E-07 |
| S11 | -4.0379E-02 | 1.1749E-02 | -2.4561E-03 | 3.5915E-04 | -3.4852E-05 | 2.0151E-06 | -5.2510E-08 |
| S12 | -1.1871E-02 | 2.7944E-03 | -4.6675E-04 | 5.3889E-05 | -4.0836E-06 | 1.8259E-07 | -3.6495E-09 |
| S13 | 3.0381E-06 | -3.3137E-07 | 2.3433E-08 | -1.0264E-09 | 2.4702E-11 | -2.1524E-13 | -1.2744E-15 |
| S14 | 1.0923E-06 | -1.0661E-07 | 6.9514E-09 | -2.8688E-10 | 6.7677E-12 | -6.9528E-14 | 0.0000E+00 |
| S15 | 1.0326E-06 | -5.3200E-08 | 1.8876E-09 | -4.3963E-11 | 6.0545E-13 | -3.7386E-15 | 0.0000E+00 |
| S16 | 3.8716E-07 | -1.8927E-08 | 6.3940E-10 | -1.4176E-11 | 1.8539E-13 | -1.0831E-15 | 0.0000E+00 |

Figure 2A:
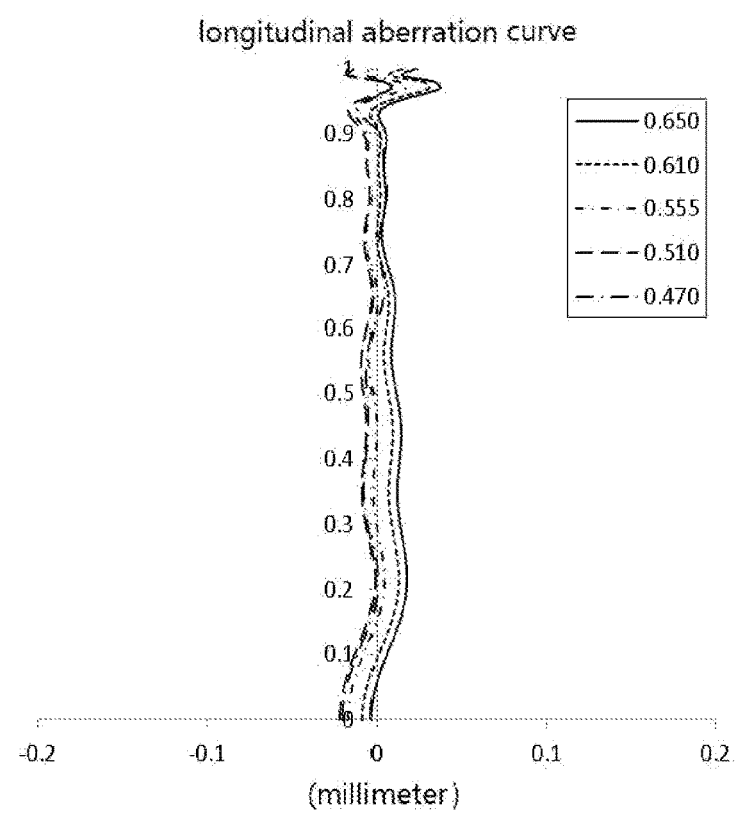
FIGS. 2A-2D respectively show a longitudinal aberration curve, an astigmatism curve, a distortion curve and a lateral color curve of the optical imaging system according to Embodiment 1.
Figure 2B:
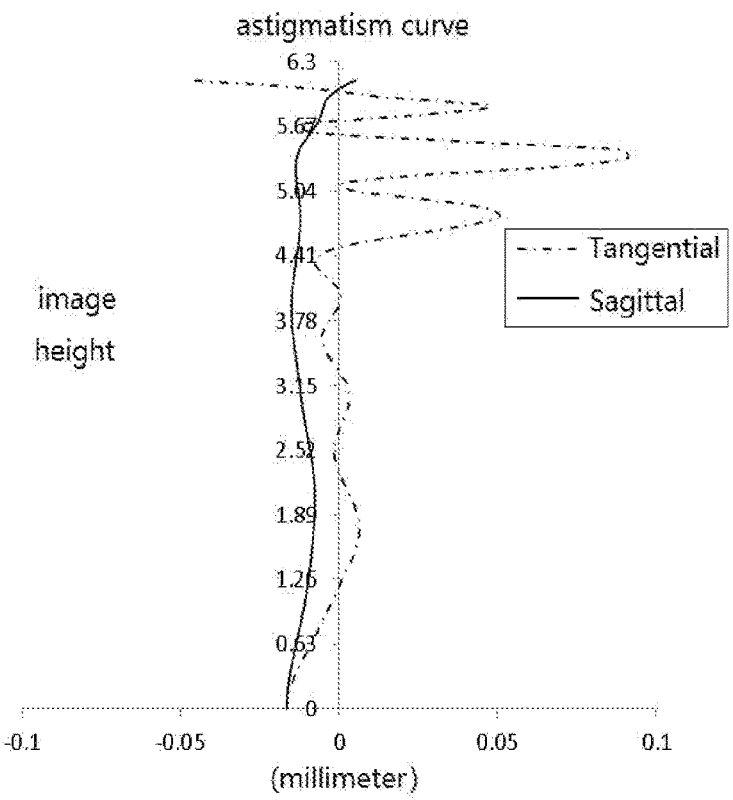
Figure 2C:
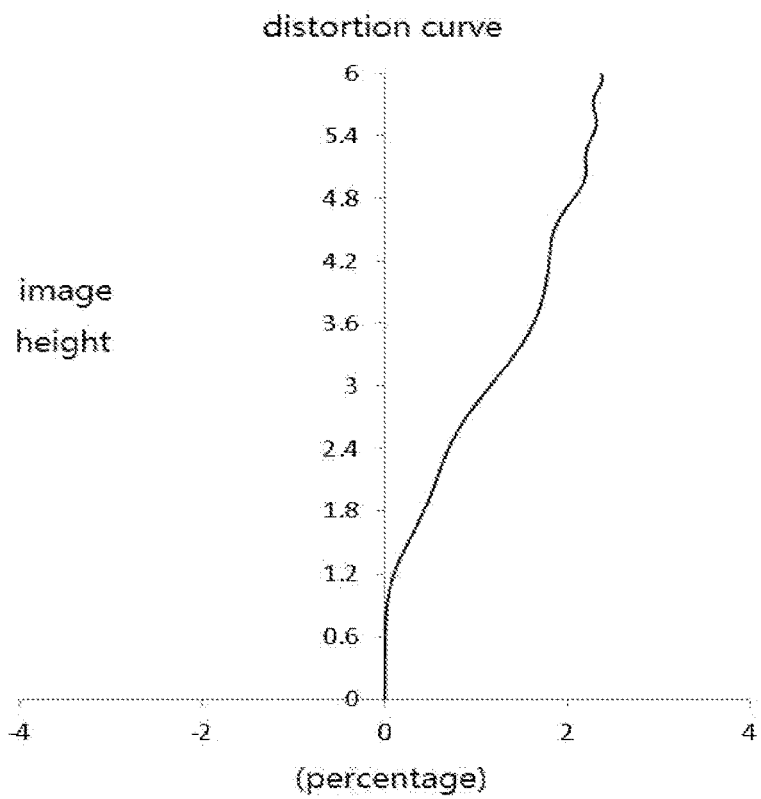
Figure 2D:
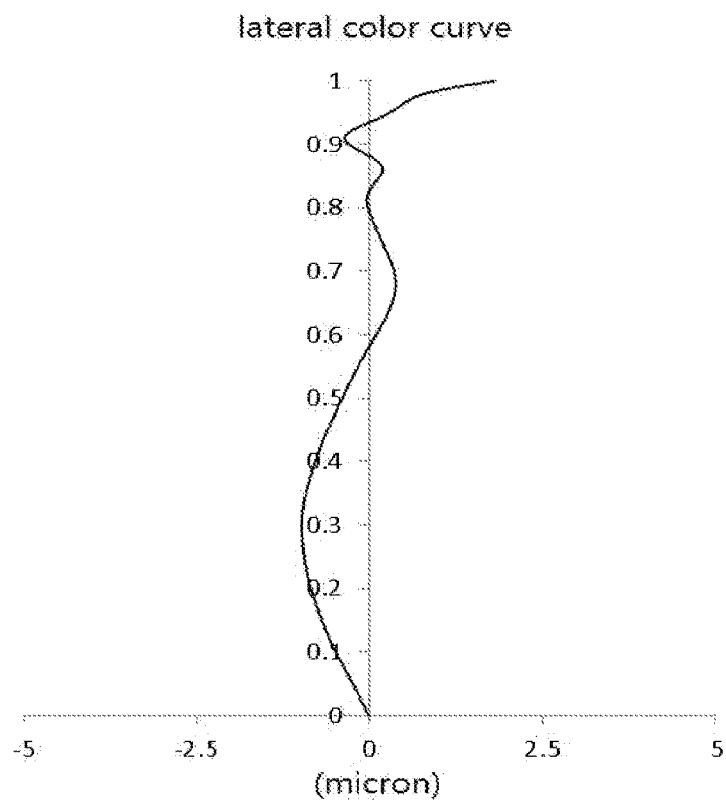

FIG. 2A shows a longitudinal aberration curve of the optical imaging system in Embodiment 1, which represents that a converging focus of light with different wavelengths deviates after passing through the system. FIG. 2B shows an astigmatism curve of the optical imaging system in Embodiment 1, which represents a meridian image surface curvature and a sagittal image surface curvature. FIG. 2C shows a distortion curve of the optical imaging system in Embodiment 1, which represents distortion values at different image heights. FIG. 2D shows a lateral color curve of the optical imaging system in Embodiment 1, which represents the aberration of different image heights on the imaging surface after the light passes through the system. It can be seen from FIG. 2A to FIG. 2D that the optical imaging system provided by Embodiment 1 can achieve good imaging quality.

Embodiment 2

Figure 3:
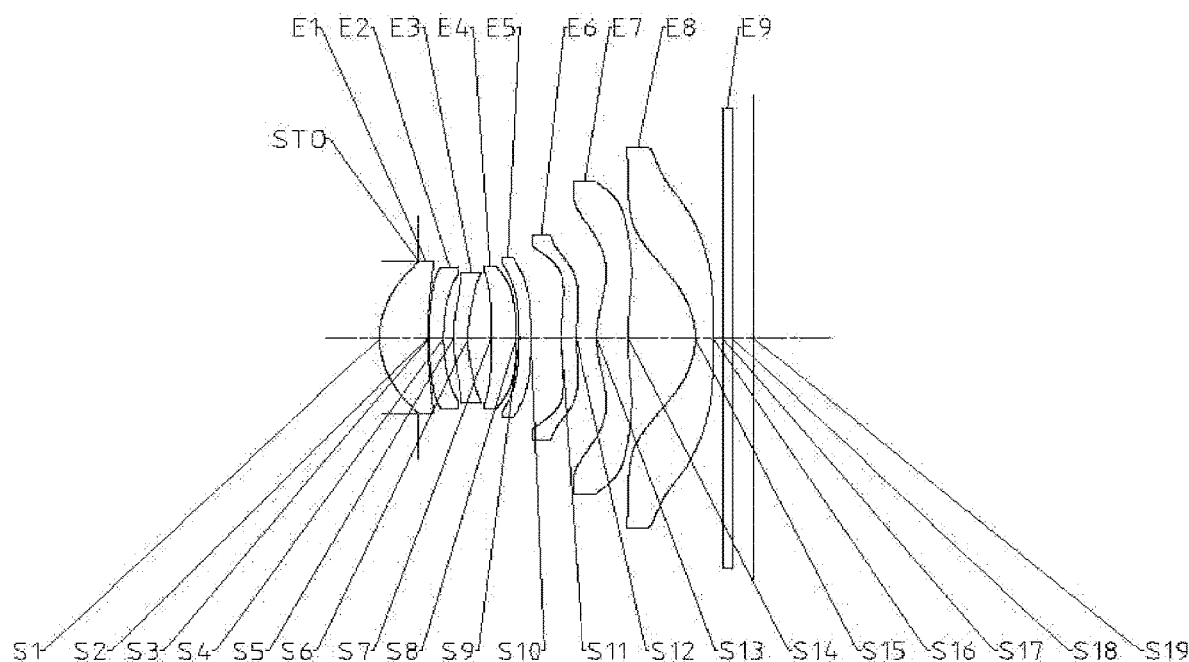
FIG. 3 shows a structure diagram of an optical imaging system according to Embodiment 2 of the disclosure.

An optical imaging system according to Embodiment 2 of the disclosure will be described below with reference to FIG. 3 to FIG. 4D. In Embodiment 2 and the following embodiments, some descriptions similar to those of Embodiment 1 will be omitted for brevity. FIG. 3 shows a structure diagram of the optical imaging system according to Embodiment 2 of the disclosure.

As shown in FIG. 3, the optical imaging system sequentially includes a diaphragm STO, a first lens E1, a second lens E2, a third lens E3, a fourth lens E4, a fifth lens E5, a sixth lens E6, a seventh lens E7, an eighth lens E8 and an optical filter E9 from an object side to an image side along an optical axis.

The first lens E1 has positive refractive power; an object-side surface S1 of the first lens is a convex surface; and an image-side surface S2 of the first lens is a concave surface. The second lens E2 has negative refractive power; an object-side surface S3 of the second lens is a convex surface; and an image-side surface S4 of the second lens is a concave surface. The third lens E3 has positive refractive power; an object-side surface S5 of the third lens is a convex surface; and an image-side surface S6 of the third lens is a concave surface. The fourth lens E4 has positive refractive power; an object-side surface S7 of the fourth lens is a concave surface; and an image-side surface S8 of the fourth lens is a convex surface. The fifth lens E5 has negative refractive power; an object-side surface S9 of the fifth lens is a concave surface; and an image-side surface S10 of the fifth lens is a convex surface. The sixth lens E6 has negative refractive power; an object-side surface S11 of the sixth lens is a convex surface; and an image-side surface S12 of the sixth lens is a concave surface. The seventh lens E7 has positive refractive power; an object-side surface S13 of the seventh lens is a convex surface; and an image-side surface S14 of the seventh lens is a concave surface. The eighth lens E8 has a negative refractive power; an object-side surface S15 of the eighth lens is a concave surface; and an image-side surface S16 of the eighth lens is a concave surface. The optical filter E9 has an object-side surface S17 and an image-side surface S18. The optical imaging system has an imaging surface S19; and light from an object sequentially penetrates through the surfaces S1 to S18 and is finally imaged on the imaging surface S19.

In Embodiment 2, the total effective focal length f of the optical imaging system is 6.72 mm; the F number Fno of the optical imaging system is 1.69; TTL is the distance from the object-side surface S1 of the first lens E1 to the imaging surface S19 on the optical axis, TTL is 7.82 mm; ImgH is the half of a diagonal length of an effective pixel region on the imaging surface S19, ImgH is 6.21 mm; and the Semi-FOV is a half of the maximum field of view, Semi-FOV is 42.1°.

Table 3 shows a list of basic parameters of the optical imaging system in Embodiment 2, in which the units of curvature radius, thickness/distance and focal length are millimetre (mm). Table 4 shows high-order coefficients applicable to each aspherical mirror surface in Embodiment 2, wherein each aspherical surface type can be defined by the formula (1) given in Embodiment 1.

TABLE 3

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.8096 | | | | |
| S1 | Aspherical | 2.7408 | 1.0000 | 1.55 | 56.1 | 6.22 | 1.9882 |
| S2 | Aspherical | 12.4124 | 0.0350 | | | | 1.9136 |
| S3 | Aspherical | 14.1536 | 0.3000 | 1.67 | 19.2 | −13.72 | 1.8476 |
| S4 | Aspherical | 5.5640 | 0.2089 | | | | 1.6697 |
| S5 | Aspherical | 4.1184 | 0.3000 | 1.67 | 20.4 | 225.06 | 1.6571 |
| S6 | Aspherical | 4.1113 | 0.4815 | | | | 1.6984 |
| S7 | Aspherical | −107.7092 | 0.5308 | 1.55 | 56.1 | 15.06 | 1.7543 |
| S8 | Aspherical | −7.6508 | 0.0621 | | | | 1.8691 |
| S9 | Aspherical | −8.2930 | 0.2366 | 1.67 | 20.4 | −25.03 | 1.9508 |
| S10 | Aspherical | −16.6793 | 0.6369 | | | | 2.1027 |
| S11 | Aspherical | 7.5079 | 0.3215 | 1.57 | 38.0 | −100.00 | 2.3944 |
| S12 | Aspherical | 6.5314 | 0.4362 | | | | 2.6935 |
| S13 | Aspherical | 3.6774 | 0.6568 | 1.55 | 56.1 | 8.28 | 3.6531 |
| S14 | Aspherical | 18.4677 | 1.4017 | | | | 4.0789 |
| S15 | Aspherical | −2.5677 | 0.3700 | 1.54 | 55.9 | −4.46 | 4.6752 |
| S16 | Aspherical | 36.8242 | 0.2019 | | | | 4.9600 |
| S17 | Spherical | Infinite | 0.2100 | 1.52 | 64.2 | | |
| S18 | Spherical | Infinite | 0.4300 | | | | |
| S19 | Spherical | Infinite | | | | | |

TABLE 4

| Surface number | A4 | A6 | A8 | A10 | A12 | A14 | A16 |
|---|---|---|---|---|---|---|---|
| S1 | −1.3816E−03 | 7.2311E−03 | −2.1532E−02 | 4.0703E−02 | −5.2713E−02 | 4.9151E−02 | −3.3872E−02 |
| S2 | −4.0681E−03 | 1.7525E−02 | 1.4742E−02 | −1.6644E−01 | 3.7154E−01 | −4.6411E−01 | 3.7938E−01 |
| S3 | 3.9196E−03 | 1.4748E−02 | 3.4150E−02 | −2.3770E−01 | 5.2879E−01 | −6.8713E−01 | 5.9199E−01 |
| S4 | −2.4736E−03 | 2.2839E−03 | 7.4589E−02 | −3.6298E−01 | 9.3098E−01 | −1.5477E+00 | 1.7776E+00 |
| S5 | −3.1370E−02 | −1.9232E−02 | 1.7031E−01 | −6.7637E−01 | 1.6781E+00 | −2.8117E+00 | 3.2943E+00 |
| S6 | −2.2684E−02 | 2.0230E−02 | −8.9008E−02 | 2.8653E−01 | −6.2918E−01 | 9.5748E−01 | −1.0270E+00 |
| S7 | −1.3557E−02 | 3.8694E−02 | −1.5657E−01 | 3.9411E−01 | −6.7368E−01 | 8.0483E−01 | −6.8728E−01 |
| S8 | 4.9809E−02 | −1.3729E−01 | 2.7513E−01 | −4.6873E−01 | 5.7394E−01 | −4.7089E−01 | 2.3652E−01 |
| S9 | 7.0694E−02 | −2.2393E−01 | 5.3233E−01 | −1.0462E+00 | 1.5093E+00 | −1.5634E+00 | 1.1688E+00 |
| S10 | 2.0996E−02 | −1.0091E−01 | 2.3227E−01 | −4.1420E−01 | 5.2743E−01 | −4.7692E−01 | 3.0984E−01 |
| S11 | −2.5846E−02 | −6.7746E−03 | 2.0076E−02 | −1.8946E−02 | 1.0032E−02 | −4.2753E−03 | 2.1289E−03 |
| S12 | −3.2968E−02 | −8.5996E−03 | 2.8541E−02 | −3.1080E−02 | 2.1816E−02 | −1.1383E−02 | 4.5630E−03 |
| S13 | −1.9518E−02 | −1.5234E−02 | 2.0467E−02 | −1.6891E−02 | 8.8963E−03 | −3.1544E−03 | 7.8250E−04 |
| S14 | 1.5166E−02 | −1.0193E−02 | 2.4484E−03 | −5.5558E−04 | 1.3835E−04 | −2.2739E−05 | 1.4243E−06 |
| S15 | −3.0099E−02 | 1.8422E−02 | −1.0914E−02 | 4.0885E−03 | −9.4812E−04 | 1.4545E−04 | −1.5394E−05 |
| S16 | −2.9017E−02 | 1.6705E−02 | −7.6992E−03 | 2.2867E−03 | −4.5001E−04 | 6.1197E−05 | −5.9009E−06 |

| Surface number | A18 | A20 | A22 | A24 | A26 | A28 | A30 |
|---|---|---|---|---|---|---|---|
| S1 | 1.7376E−02 | −6.5915E−03 | 1.8151E−03 | −3.5106E−04 | 4.5043E−05 | −3.4316E−06 | 1.1722E−07 |
| S2 | −2.1391E−01 | 8.4641E−02 | −2.3416E−02 | 4.4227E−03 | −5.4103E−04 | 3.8383E−05 | −1.1871E−06 |
| S3 | −3.5372E−01 | 1.4872E−01 | −4.3787E−02 | 8.8096E−03 | −1.1483E−03 | 8.6742E−05 | −2.8507E−06 |
| S4 | −1.4476E+00 | 8.4237E−01 | −3.4793E−01 | 9.9603E−02 | −1.8787E−02 | 2.0994E−03 | −1.0527E−04 |
| S5 | −2.7458E+00 | 1.6357E+00 | −6.9090E−01 | 2.0196E−01 | −3.8830E−02 | 4.4157E−03 | −2.2497E−04 |
| S6 | 7.8544E−01 | −4.2948E−01 | 1.6647E−01 | −4.4640E−02 | 8.8753E−03 | −8.2245E−04 | 3.8538E−05 |
| S7 | 4.2451E−01 | −1.9001E−01 | 6.1050E−02 | −1.3736E−02 | 2.0571E−03 | −1.8442E−04 | 7.4951E−06 |
| S8 | −4.9080E−02 | −1.9900E−02 | 1.9390E−02 | −7.1672E−03 | 1.4701E−03 | −1.6465E−04 | 7.8911E−06 |
| S9 | −6.3405E−01 | 2.4930E−01 | −7.0246E−02 | 1.3815E−02 | −1.7997E−03 | 1.3950E−04 | −4.8704E−06 |
| S10 | −1.4580E−01 | 4.9679E−02 | −1.2124E−02 | 2.0642E−03 | −2.3265E−04 | 1.5590E−05 | −4.7000E−07 |
| S11 | −1.1044E−03 | 4.3516E−04 | −1.1612E−04 | 2.0325E−05 | −2.2415E−06 | 1.4159E−07 | −3.9119E−09 |
| S12 | −1.3943E−03 | 3.1697E−04 | −5.1959E−05 | 5.9066E−06 | −4.3928E−07 | 1.9164E−08 | −3.7133E−10 |
| S13 | −1.3846E−04 | 1.7559E−05 | −1.5821E−06 | 9.8804E−08 | −4.0629E−09 | 9.8903E−11 | −1.0794E−12 |
| S14 | 1.5853E−07 | −4.0356E−08 | 3.7178E−09 | −1.8394E−10 | 4.8507E−12 | −5.3744E−14 | 0.0000E+00 |
| S15 | 1.1448E−06 | −5.9795E−08 | 2.1507E−09 | −5.0767E−11 | 7.0847E−13 | −4.4326E−15 | 0.0000E+00 |
| S16 | 4.0682E−07 | −1.9903E−08 | 6.7399E−10 | −1.5003E−11 | 1.9733E−13 | −1.1612E−15 | 0.0000E+00 |

Figure 4A:
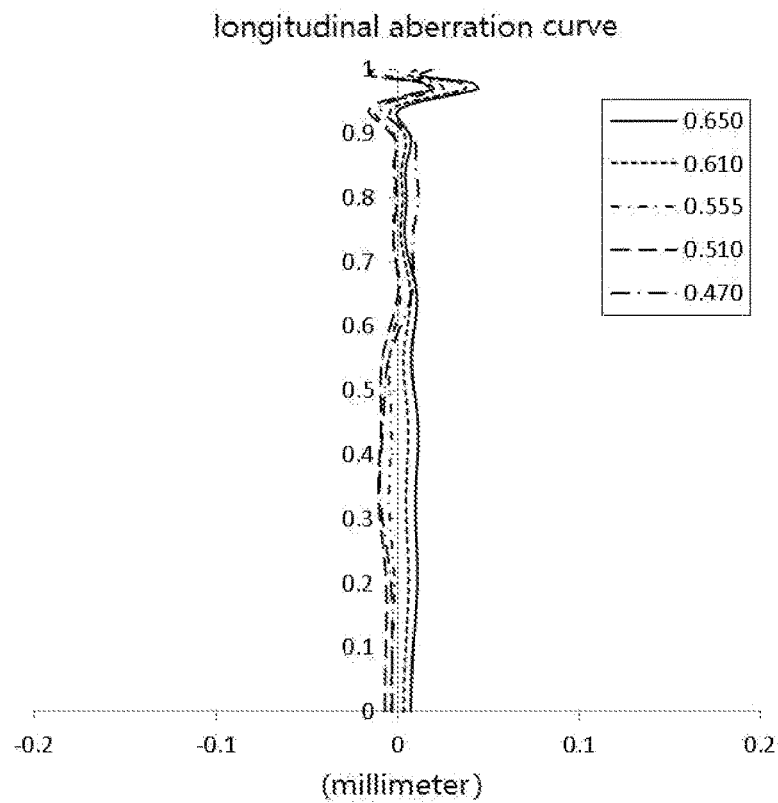
FIGS. 4A-4D respectively show a longitudinal aberration curve, an astigmatism curve, a distortion curve and a lateral color curve of the optical imaging system according to Embodiment 2.
Figure 4B:
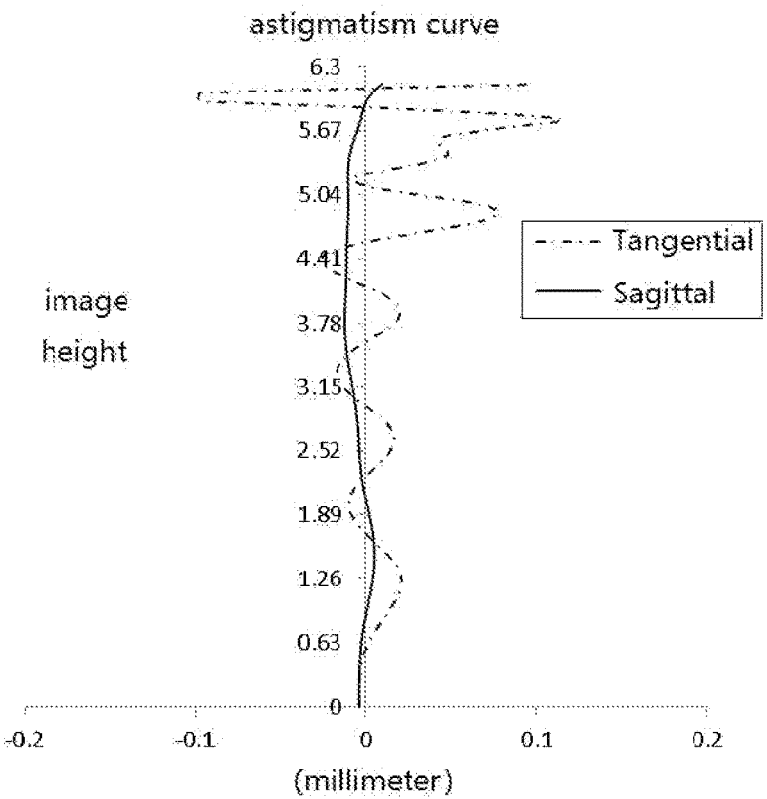
Figure 4C:
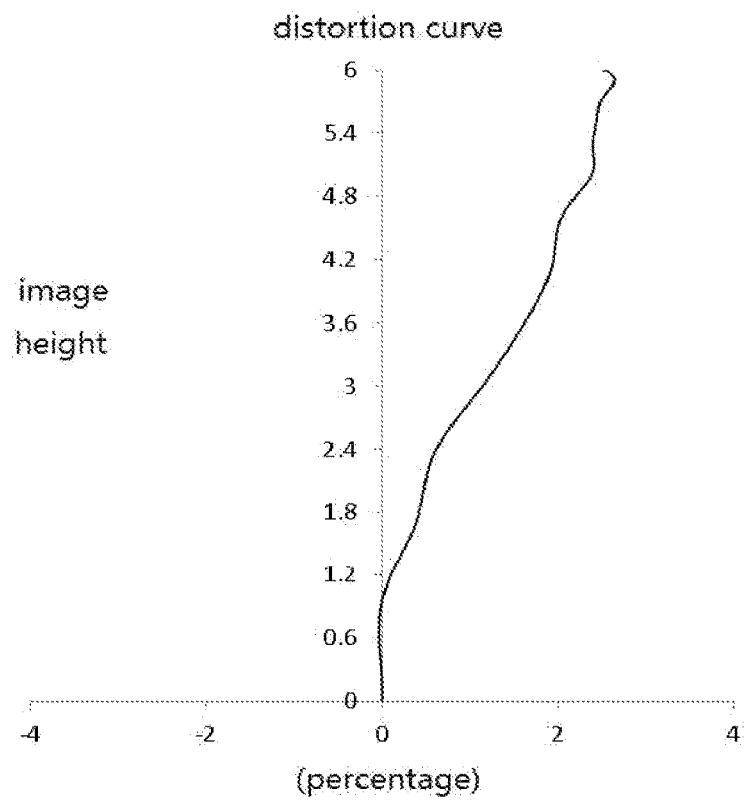
Figure 4D:
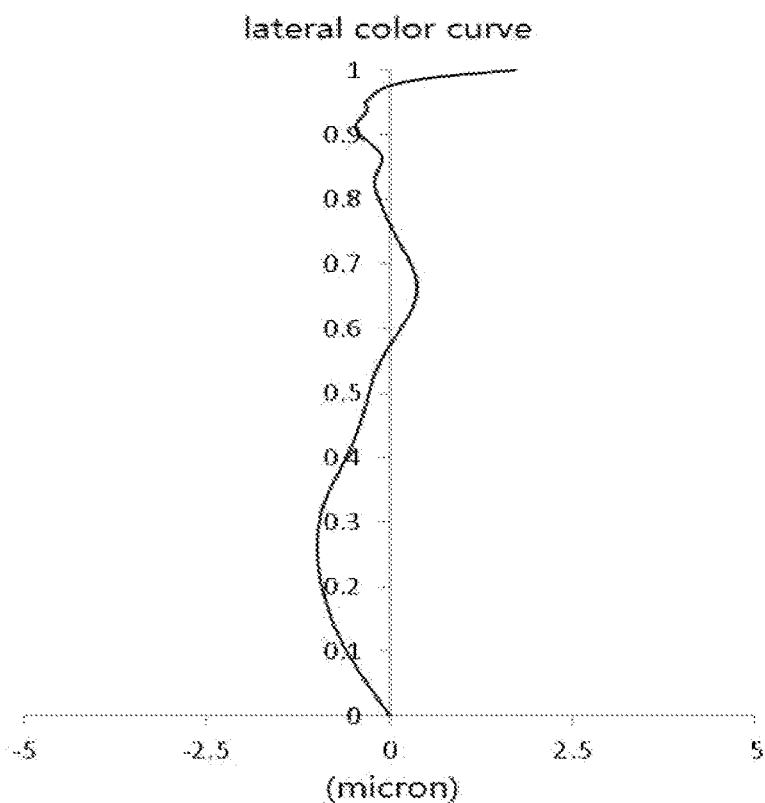

FIG. 4A shows a longitudinal aberration curve of the optical imaging system in Embodiment 2, which represents that a converging focus of light with different wavelengths deviates after passing through the system. FIG. 4B shows an astigmatism curve of the optical imaging system in Embodiment 2, which represents a meridian image surface curvature and a sagittal image surface curvature. FIG. 4C shows a distortion curve of the optical imaging system in Embodiment 1, which represents distortion values at different image heights. FIG. 4D shows a lateral color curve of the optical imaging system in Embodiment 2, which represents the aberration of different image heights on the imaging surface after the light passes through the system. It can be seen from FIG. 4A to FIG. 4D that the optical imaging system provided by Embodiment 2 can achieve good imaging quality.

Embodiment 3

Figure 5:
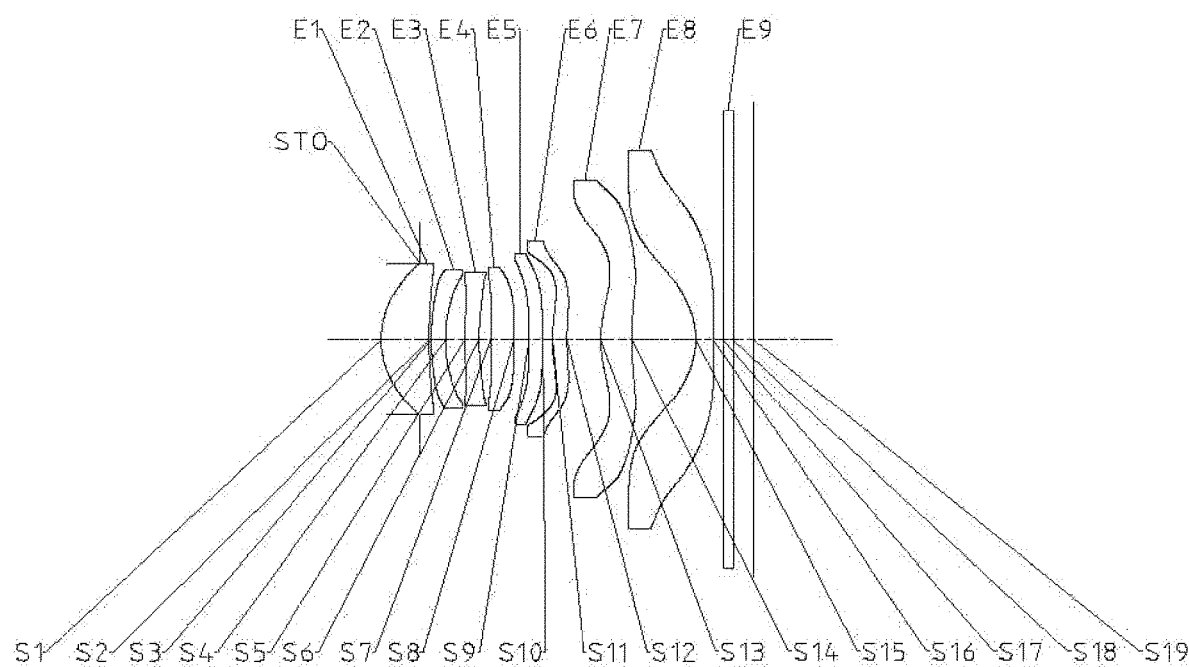
FIG. 5 shows a structure diagram of an optical imaging system according to Embodiment 3 of the disclosure.

An optical imaging system according to Embodiment 3 of the disclosure will be described below with reference to FIG. 5 to FIG. 6D. FIG. 5 shows a structure diagram of the optical imaging system according to Embodiment 3 of the disclosure.

As shown in FIG. 5, the optical imaging system sequentially includes a diaphragm STO, a first lens E1, a second lens E2, a third lens E3, a fourth lens E4, a fifth lens E5, a sixth lens E6, a seventh lens E7, an eighth lens E8 and an optical filter E9 from an object side to an image side along an optical axis.

The first lens E1 has positive refractive power; an object-side surface S1 of the first lens is a convex surface; and an image-side surface S2 of the first lens is a concave surface. The second lens E2 has negative refractive power; an object-side surface S3 of the second lens is a convex surface; and an image-side surface S4 of the second lens is a concave surface. The third lens E3 has negative refractive power; an object-side surface S5 of the third lens is a convex surface; and an image-side surface S6 of the third lens is a concave surface. The fourth lens E4 has positive refractive power; an object-side surface S7 of the fourth lens is a convex surface; and an image-side surface S8 of the fourth lens is a convex surface. The fifth lens E5 has positive refractive power; an object-side surface S9 of the fifth lens is a concave surface; and an image-side surface S10 of the fifth lens is a convex surface. The sixth lens E6 has positive refractive power; an object-side surface S11 of the sixth lens is a convex surface; and an image-side surface S12 of the sixth lens is a concave surface. The seventh lens E7 has positive refractive power; an object-side surface S13 of the seventh lens is a convex surface; and an image-side surface S14 of the seventh lens is a concave surface. The eighth lens E8 has a negative refractive power; an object-side surface S15 of the eighth lens is a concave surface; and an image-side surface S16 of the eighth lens is a concave surface. The optical filter E9 has an object-side surface S17 and an image-side surface S18. The optical imaging system has an imaging surface S19; and light from an object sequentially penetrates through the surfaces S1 to S18 and is finally imaged on the imaging surface S19.

In Embodiment 3, the total effective focal length f of the optical imaging system is 6.72 mm; the F number Fno of the optical imaging system is 1.69; TTL is the distance from the object-side surface S1 of the first lens E1 to the imaging surface S19 on the optical axis, TTL is 7.82 mm; ImgH is the half of a diagonal length of an effective pixel region on the imaging surface S19, ImgH is 6.21 mm; and the Semi-FOV is a half of the maximum field of view, Semi-FOV is 42.0°.

Table 5 shows a list of basic parameters of the optical imaging system in Embodiment 3, in which the units of curvature radius, thickness/distance and focal length are millimetre (mm). Table 6 shows high-order coefficients applicable to each aspherical mirror surface in Embodiment 3, wherein each aspherical surface type can be defined by the formula (1) given in Embodiment 1.

TABLE 5

| Surface number | Surface type | Curvature radius | Thickness/distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.8041 | | | | |
| S1 | Aspherical | 2.7797 | 1.0000 | 1.55 | 56.1 | 6.25 | 1.9882 |
| S2 | Aspherical | 13.1038 | 0.0480 | | | | 1.9104 |
| S3 | Aspherical | 7.0856 | 0.3000 | 1.67 | 19.2 | −18.99 | 1.8180 |
| S4 | Aspherical | 4.4915 | 0.4005 | | | | 1.6423 |
| S5 | Aspherical | 10.3319 | 0.3000 | 1.67 | 20.4 | −37.61 | 1.6308 |
| S6 | Aspherical | 7.2313 | 0.2436 | | | | 1.7369 |
| S7 | Aspherical | 26.9295 | 0.4908 | 1.55 | 56.1 | 31.68 | 1.7745 |
| S8 | Aspherical | −48.0413 | 0.3212 | | | | 1.8756 |
| S9 | Aspherical | −9.3594 | 0.2829 | 1.67 | 20.4 | 80.08 | 2.0721 |
| S10 | Aspherical | −8.0593 | 0.2065 | | | | 2.2457 |
| S11 | Aspherical | 7.2145 | 0.2951 | 1.57 | 38.0 | 1685.37 | 2.2931 |
| S12 | Aspherical | 7.1611 | 0.7263 | | | | 2.5804 |
| S13 | Aspherical | 4.1780 | 0.6552 | 1.55 | 56.1 | 9.68 | 3.7805 |
| S14 | Aspherical | 18.8616 | 1.3375 | | | | 4.1377 |
| S15 | Aspherical | −2.5721 | 0.3700 | 1.54 | 55.9 | −4.47 | 4.6902 |
| S16 | Aspherical | 37.9477 | 0.2011 | | | | 4.9528 |
| S17 | Spherical | Infinite | 0.2100 | 1.52 | 64.2 | | |
| S18 | Spherical | Infinite | 0.4312 | | | | |
| S19 | Spherical | Infinite | | | | | |

TABLE 6

| Surface number | A4 | A6 | A8 | A10 | A12 | A14 | A16 |
|---|---|---|---|---|---|---|---|
| S1 | −2.3134E−03 | 1.2739E−02 | −4.2074E−02 | 9.0224E−02 | −1.3196E−01 | 1.3567E−01 | −9.9805E−02 |
| S2 | −8.4830E−03 | 5.4717E−03 | −7.6452E−03 | 1.1119E−02 | −1.5483E−02 | 2.2942E−02 | −2.7584E−02 |
| S3 | −7.6765E−03 | −2.9677E−03 | 3.2754E−02 | −1.1332E−01 | 2.3163E−01 | −2.9899E−01 | 2.5631E−01 |
| S4 | −1.9187E−03 | 1.2237E−02 | −1.0398E−01 | 4.1331E−01 | −9.9076E−01 | 1.5690E+00 | −1.7148E+00 |
| S5 | −9.7048E−03 | −5.6348E−02 | 3.0324E−01 | −1.0863E+00 | 2.5703E+00 | −4.1704E+00 | 4.7611E+00 |
| S6 | −6.9746E−03 | −2.7953E−02 | 9.3885E−02 | −2.0818E−01 | 3.0668E−01 | −3.0529E−01 | 2.0295E−01 |
| S7 | −9.8613E−03 | −4.3669E−03 | 1.1783E−03 | 2.5536E−02 | −8.2471E−02 | 1.3564E−01 | −1.4305E−01 |
| S8 | −7.5610E−03 | 1.3869E−02 | −1.5337E−01 | 4.6644E−01 | −8.4888E−01 | 1.0415E+00 | −9.0216E−01 |
| S9 | 7.9430E−02 | −1.1390E−01 | 4.6885E−02 | 8.5639E−02 | −1.9048E−01 | 1.9513E−01 | −1.2683E−01 |
| S10 | 1.3662E−01 | −2.4980E−01 | 3.0867E−01 | −3.0369E−01 | 2.4037E−01 | −1.5372E−01 | 7.8763E−02 |
| S11 | 7.6076E−02 | −2.7131E−01 | 4.9274E−01 | −6.5704E−01 | 6.4402E−01 | −4.6445E−01 | 2.4675E−01 |
| S12 | −5.3907E−03 | −1.0020E−01 | 2.0350E−01 | −2.6667E−01 | 2.4232E−01 | −1.5617E−01 | 7.2218E−02 |
| S13 | −6.2001E−03 | −1.1557E−02 | 5.8461E−03 | −2.7963E−03 | 1.0165E−03 | −2.4480E−04 | 3.8591E−05 |
| S14 | 1.8498E−02 | −1.1637E−02 | 2.7928E−03 | −8.8097E−04 | 3.3159E−04 | −8.2800E−05 | 1.2743E−05 |
| S15 | −2.2494E−02 | 1.4734E−02 | −1.0667E−02 | 4.3382E−03 | −1.0377E−03 | 1.6079E−04 | −1.7010E−05 |
| S16 | −2.2754E−02 | 1.4158E−02 | −7.4736E−03 | 2.3901E−03 | −4.8871E−04 | 6.7827E−05 | −6.6137E−06 |

| Surface number | A18 | A20 | A22 | A24 | A26 | A28 | A30 |
|---|---|---|---|---|---|---|---|
| S1 | 5.2945E−02 | −2.0225E−02 | 5.4977E−03 | −1.0352E−03 | 1.2810E−04 | −9.3572E−06 | 3.0525E−07 |
| S2 | 2.3064E−02 | −1.3083E−02 | 5.0295E−03 | −1.2930E−03 | 2.1324E−04 | −2.0420E−05 | 8.6424E−07 |
| S3 | −1.4939E−01 | 5.9245E−02 | −1.5594E−02 | 2.5436E−03 | −2.1255E−04 | 2.2763E−06 | 6.3766E−07 |
| S4 | 1.3235E+00 | −7.2694E−01 | 2.8230E−01 | −7.5676E−02 | 1.3307E−02 | −1.3795E−03 | 6.3790E−05 |
| S5 | −3.8805E+00 | 2.2667E+00 | −9.4115E−01 | 2.7108E−01 | −5.1480E−02 | 5.7959E−03 | −2.9301E−04 |
| S6 | −8.3568E−02 | 1.4821E−02 | 4.1068E−03 | −3.3666E−03 | 9.4923E−04 | −1.3309E−04 | 7.7219E−06 |
| S7 | 1.0346E−01 | −5.2535E−02 | 1.8760E−02 | −4.6265E−03 | 7.5184E−04 | −7.2528E−05 | 3.1453E−06 |
| S8 | 5.6280E−01 | −2.5395E−01 | 8.2124E−02 | −1.8552E−02 | 2.7791E−03 | −2.4794E−04 | 9.9688E−06 |
| S9 | 5.6242E−02 | −1.7334E−02 | 3.6837E−03 | −5.2249E−04 | 4.6136E−05 | −2.1854E−06 | 3.7111E−08 |
| S10 | −3.1659E−02 | 9.7101E−03 | −2.2005E−03 | 3.5370E−04 | −3.7914E−05 | 2.4210E−06 | −6.9468E−08 |
| S11 | −9.6562E−02 | 2.7696E−02 | −5.7423E−03 | 8.3688E−04 | −8.1287E−05 | 4.7233E−06 | −1.2418E−07 |
| S12 | −2.4093E−02 | 5.7866E−03 | −9.8842E−04 | 1.1689E−04 | −9.0833E−06 | 4.1686E−07 | −8.5568E−09 |
| S13 | −4.0003E−06 | 2.6945E−07 | −1.1260E−08 | 2.5867E−10 | −2.2016E−12 | −6.9367E−15 | −1.4007E−16 |
| S14 | −1.2361E−06 | 7.5353E−08 | −2.7288E−09 | 4.8275E−11 | −5.1619E−14 | −7.5809E−15 | 0.0000E+00 |
| S15 | 1.2572E−06 | −6.5034E−08 | 2.3114E−09 | −5.3833E−11 | 7.4049E−13 | −4.5633E−15 | 0.0000E+00 |
| S16 | 4.5892E−07 | −2.2548E−08 | 7.6599E−10 | −1.7099E−11 | 2.2550E−13 | −1.3305E−15 | 0.0000E+00 |

Figure 6A:
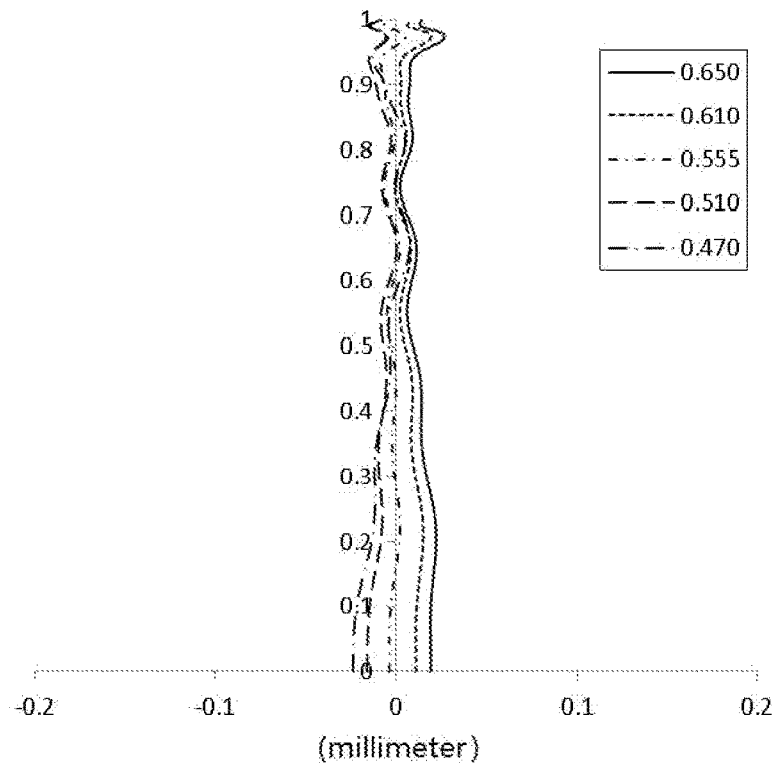
FIGS. 6A-6D respectively show a longitudinal aberration curve, an astigmatism curve, a distortion curve and a lateral color curve of the optical imaging system according to Embodiment 3.
Figure 6B:
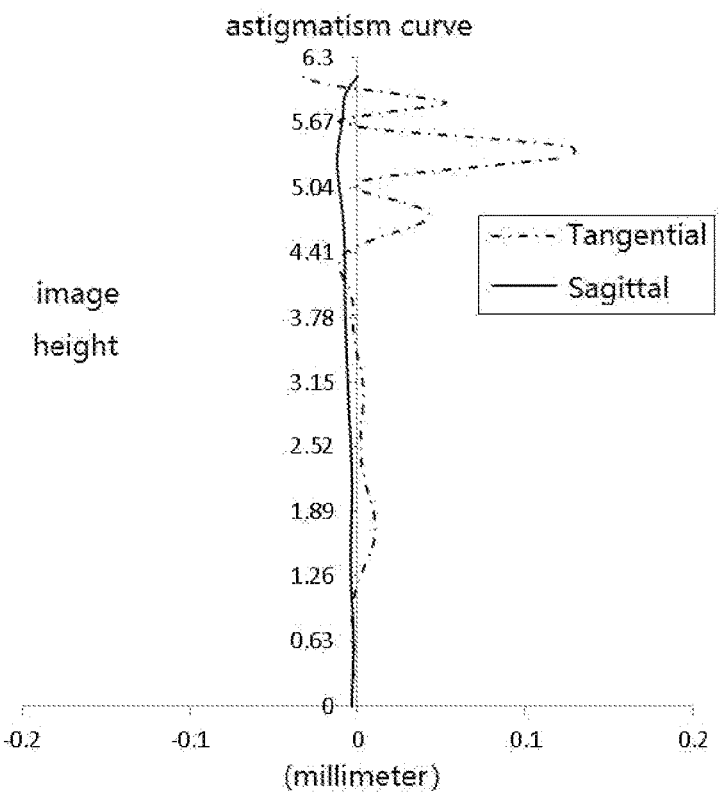
Figure 6C:
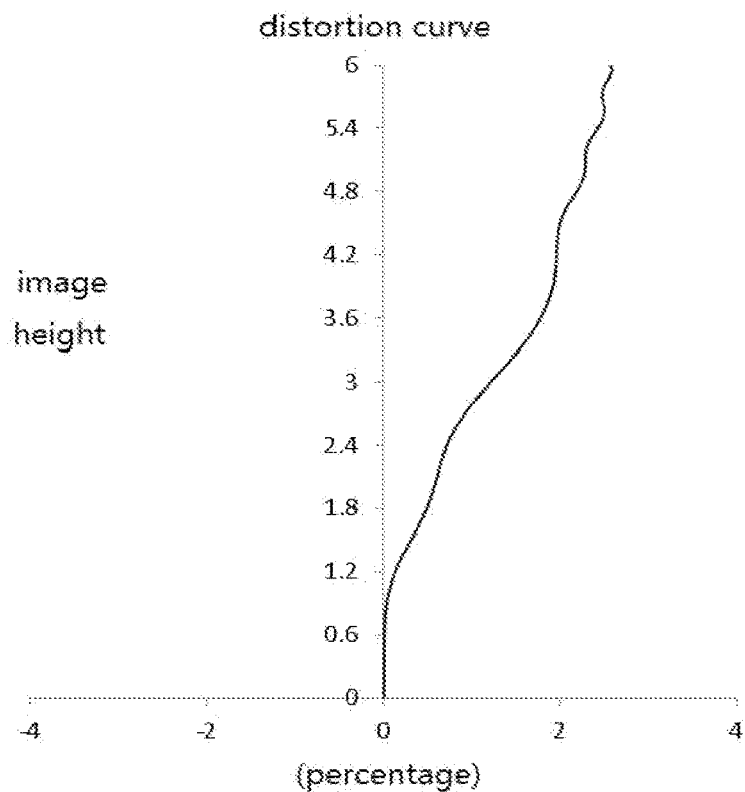
Figure 6D:
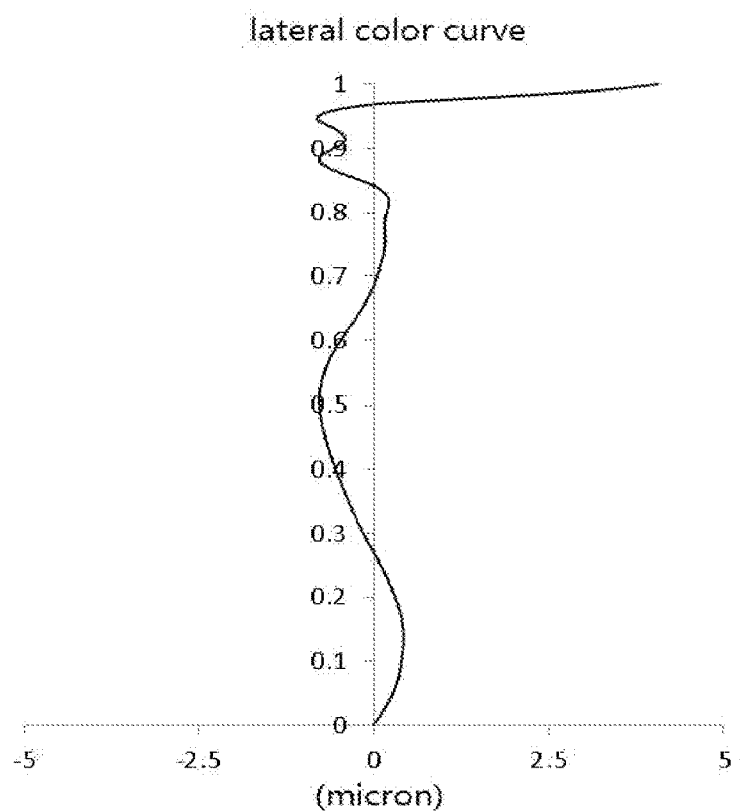

FIG. 6A shows a longitudinal aberration curve of the optical imaging system in Embodiment 3, which represents that a converging focus of light with different wavelengths deviates after passing through the system. FIG. 6B shows an astigmatism curve of the optical imaging system in Embodiment 3, which represents a meridian image surface curvature and a sagittal image surface curvature. FIG. 6C shows a distortion curve of the optical imaging system in Embodiment 3, which represents distortion values at different image heights. FIG. 6D shows a lateral color curve of the optical imaging system in Embodiment 3, which represents the aberration of different image heights on the imaging surface after the light passes through the system. It can be seen from FIG. 6A to FIG. 6D that the optical imaging system provided by Embodiment 3 can achieve good imaging quality.

Embodiment 4

Figure 7:
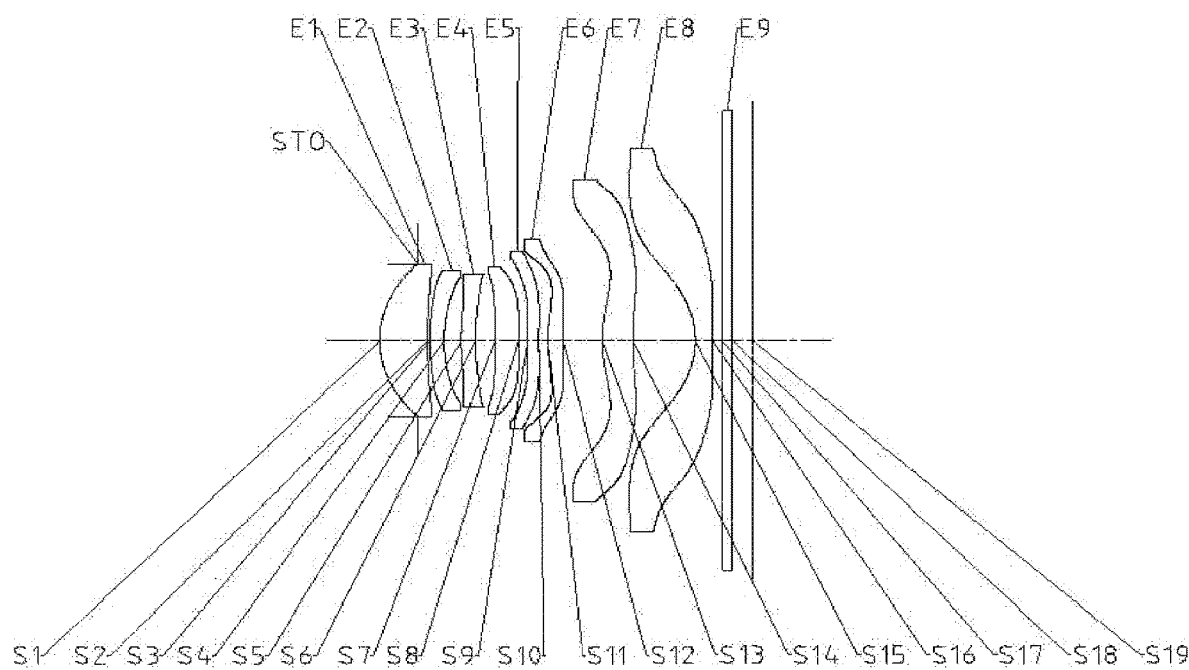
FIG. 7 shows a structure diagram of an optical imaging system according to Embodiment 4 of the disclosure.

An optical imaging system according to Embodiment 4 of the disclosure will be described below with reference to FIG. 7 to FIG. 8D. FIG. 7 shows a structure diagram of the optical imaging system according to Embodiment 4 of the disclosure.

As shown in FIG. 7, the optical imaging system sequentially includes a diaphragm STO, a first lens E1, a second lens E2, a third lens E3, a fourth lens E4, a fifth lens E5, a sixth lens E6, a seventh lens E7, an eighth lens E8 and an optical filter E9 from an object side to an image side along an optical axis.

The first lens E1 has positive refractive power; an object-side surface S1 of the first lens is a convex surface; and an image-side surface S2 of the first lens is a concave surface. The second lens E2 has negative refractive power; an object-side surface S3 of the second lens is a convex surface; and an image-side surface S4 of the second lens is a concave surface. The third lens E3 has negative refractive power; an object-side surface S5 of the third lens is a convex surface; and an image-side surface S6 of the third lens is a concave surface. The fourth lens E4 has negative refractive power; an object-side surface S7 of the fourth lens is a concave surface; and an image-side surface S8 of the fourth lens is a concave surface. The fifth lens E5 has negative refractive power; an object-side surface S9 of the fifth lens is a convex surface; and an image-side surface S10 of the fifth lens is a concave surface. The sixth lens E6 has positive refractive power; an object-side surface S11 of the sixth lens is a convex surface; and an image-side surface S12 of the sixth lens is a concave surface. The seventh lens E7 has positive refractive power; an object-side surface S13 of the seventh lens is a convex surface; and an image-side surface S14 of the seventh lens is a concave surface. The eighth lens E8 has a negative refractive power; an object-side surface S15 of the eighth lens is a concave surface; and an image-side surface S16 of the eighth lens is a concave surface. The optical filter E9 has an object-side surface S17 and an image-side surface S18. The optical imaging system has an imaging surface S19; and light from an object sequentially penetrates through the surfaces S1 to S18 and is finally imaged on the imaging surface S19.

In Embodiment 4, the total effective focal length f of the optical imaging system is 6.72 mm; the F number Fno of the optical imaging system is 1.69; TTL is the distance from the object-side surface S1 of the first lens E1 to the imaging surface S19 on the optical axis, TTL is 7.82 mm; ImgH is the half of a diagonal length of an effective pixel region on the imaging surface S19, ImgH is 6.21 mm; and the Semi-FOV is a half of the maximum field of view, Semi-FOV is 42.0°.

Table 7 shows a list of basic parameters of the optical imaging system in Embodiment 4, in which the units of curvature radius, thickness/distance and focal length are millimetre (mm). Table 8 shows high-order coefficients applicable to each aspherical mirror surface in Embodiment 4, wherein each aspherical surface type can be defined by the formula (1) given in Embodiment 1.

TABLE 7

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7831 | | | | |
| S1 | Aspherical | 2.7999 | 1.0000 | 1.55 | 56.1 | 6.16 | 1.9882 |
| S2 | Aspherical | 14.5869 | 0.0481 | | | | 1.9167 |
| S3 | Aspherical | 7.0576 | 0.3000 | 1.67 | 19.2 | −16.67 | 1.8190 |
| S4 | Aspherical | 4.2692 | 0.3554 | | | | 1.6421 |
| S5 | Aspherical | 8.1182 | 0.3000 | 1.67 | 20.4 | −110.04 | 1.6441 |
| S6 | Aspherical | 7.2011 | 0.4053 | | | | 1.7314 |
| S7 | Aspherical | −586.8934 | 0.4951 | 1.55 | 56.1 | −120.79 | 1.8144 |
| S8 | Aspherical | 74.3110 | 0.1862 | | | | 1.9179 |
| S9 | Aspherical | 16.2782 | 0.2356 | 1.67 | 20.4 | −29.36 | 2.1050 |
| S10 | Aspherical | 8.8344 | 0.1879 | | | | 2.2928 |
| S11 | Aspherical | 3.8225 | 0.3198 | 1.57 | 38.0 | 11.77 | 2.3392 |
| S12 | Aspherical | 8.6046 | 0.8336 | | | | 2.6322 |
| S13 | Aspherical | 4.5142 | 0.6447 | 1.55 | 56.1 | 10.69 | 3.8666 |
| S14 | Aspherical | 18.9256 | 1.2958 | | | | 4.1777 |
| S15 | Aspherical | −2.5723 | 0.3700 | 1.54 | 55.9 | −4.47 | 4.7329 |
| S16 | Aspherical | 38.1047 | 0.2001 | | | | 4.9894 |
| S17 | Spherical | Infinite | 0.2100 | 1.52 | 64.2 | | |
| S18 | Spherical | Infinite | 0.4324 | | | | |
| S19 | Spherical | Infinite | | | | | |

TABLE 8

| Surface number | A4 | A6 | A8 | A10 | A12 | A14 | A16 |
|---|---|---|---|---|---|---|---|
| S1 | −4.0047E−03 | 2.2414E−02 | −7.4796E−02 | 1.6227E−01 | −2.4079E−01 | 2.5153E−01 | −1.8816E−01 |
| S2 | −9.3341E−03 | 1.1898E−02 | −3.9001E−02 | 1.0969E−01 | −2.0279E−01 | 2.5219E−01 | −2.1778E−01 |
| S3 | −1.0916E−02 | 7.1541E−05 | 2.4770E−02 | −8.3337E−02 | 1.6780E−01 | −2.1847E−01 | 1.9205E−01 |
| S4 | −7.6888E−03 | 4.1182E−02 | −2.9205E−01 | 1.1207E+00 | −2.6669E+00 | 4.2379E+00 | −4.6806E+00 |
| S5 | −9.7935E−03 | −4.1013E−02 | 2.1438E−01 | −7.6233E−01 | 1.7875E+00 | −2.8791E+00 | 3.2703E+00 |
| S6 | −4.9927E−03 | −2.6308E−02 | 8.7931E−02 | −2.0108E−01 | 3.0757E−01 | −3.2131E−01 | 2.2923E−01 |
| S7 | −1.7273E−02 | 2.5099E−02 | −5.7411E−02 | 7.3711E−02 | −4.5394E−02 | −1.5069E−02 | 5.7347E−02 |
| S8 | −1.1474E−01 | 4.0599E−01 | −1.1314E+00 | 2.1451E+00 | −2.8744E+00 | 2.7820E+00 | −1.9725E+00 |
| S9 | −1.9198E−01 | 5.9037E−01 | −1.2789E+00 | 1.8946E+00 | −2.0009E+00 | 1.5371E+00 | −8.6783E−01 |
| S10 | −2.0784E−01 | 5.1560E−01 | −9.1172E−01 | 1.1132E+00 | −9.7633E−01 | 6.2692E−01 | −2.9717E−01 |
| S11 | −1.4551E−01 | 1.8322E−01 | −1.5677E−01 | 3.3502E−02 | 8.5782E−02 | −1.1968E−01 | 8.4469E−02 |
| S12 | −5.9290E−02 | 9.7495E−03 | 7.0750E−02 | −1.4826E−01 | 1.6173E−01 | −1.1443E−01 | 5.5926E−02 |
| S13 | −1.2056E−02 | −5.0462E−03 | 3.4198E−03 | −2.5562E−03 | 1.1623E−03 | −3.1702E−04 | 5.5310E−05 |
| S14 | 1.2717E−02 | −9.2495E−03 | 3.3431E−03 | −1.8188E−03 | 7.5527E−04 | −1.9068E−04 | 3.0499E−05 |
| S15 | −2.4946E−02 | 1.8137E−02 | −1.2828E−02 | 5.0854E−03 | −1.1931E−03 | 1.8158E−04 | −1.8870E−05 |
| S16 | −2.2576E−02 | 1.5313E−02 | −8.1335E−03 | 2.5430E−03 | −5.0189E−04 | 6.6677E−05 | −6.1910E−06 |

| Surface number | A18 | A20 | A22 | A24 | A26 | A28 | A30 |
|---|---|---|---|---|---|---|---|
| S1 | 1.0159E−01 | −3.9542E−02 | 1.0971E−02 | −2.1127E−03 | 2.6806E−04 | −2.0133E−05 | 6.7754E−07 |
| S2 | 1.3320E−01 | −5.8121E−02 | 1.7983E−02 | −3.8560E−03 | 5.4509E−04 | −4.5706E−05 | 1.7226E−06 |
| S3 | −1.1644E−01 | 4.8889E−02 | −1.4022E−02 | 2.6448E−03 | −3.0258E−04 | 1.7462E−05 | −2.7700E−07 |
| S4 | 3.6693E+00 | −2.0554E+00 | 8.1701E−01 | −2.2497E−01 | 4.0788E−02 | −4.3778E−03 | 2.1064E−04 |
| S5 | −2.6562E+00 | 1.5476E+00 | −6.4126E−01 | 1.8434E−01 | −3.4937E−02 | 3.9246E−03 | −1.9790E−04 |
| S6 | −1.0711E−01 | 2.8094E−02 | −7.1945E−04 | −2.2638E−03 | 8.0415E−04 | −1.2449E−04 | 7.6798E−06 |
| S7 | −5.6692E−02 | 3.2877E−02 | −1.2458E−02 | 3.1282E−03 | −5.0328E−04 | 4.7101E−05 | −1.9553E−06 |
| S8 | 1.0307E+00 | −3.9596E−01 | 1.1038E−01 | −2.1716E−02 | 2.8579E−03 | −2.2579E−04 | 8.0984E−06 |
| S9 | 3.6104E−01 | −1.1010E−01 | 2.4242E−02 | −3.7424E−03 | 3.8355E−04 | −2.3395E−05 | 6.4162E−07 |
| S10 | 1.0407E−01 | −2.6743E−02 | 4.9609E−03 | −6.4419E−04 | 5.5372E−05 | −2.8205E−06 | 6.4214E−08 |
| S11 | −3.8742E−02 | 1.2283E−02 | −2.7283E−03 | 4.1834E−04 | −4.2285E−05 | 2.5391E−06 | −6.8651E−08 |

TABLE 8-continued

| | | | | | | | |
|---|---|---|---|---|---|---|---|
| S12 | −1.9347E−02 | 4.7669E−03 | −8.2983E−04 | 9.9586E−05 | −7.8305E−06 | 3.6288E−07 | −7.5103E−09 |
| S13 | −6.4081E−06 | 4.9863E−07 | −2.5673E−08 | 8.3078E−10 | −1.4832E−11 | 9.2265E−14 | 5.2077E−16 |
| S14 | −3.2211E−06 | 2.2810E−07 | −1.0716E−08 | 3.1980E−10 | −5.4688E−12 | 4.0580E−14 | 0.0000E+00 |
| S15 | 1.3701E−06 | −6.9636E−08 | 2.4321E−09 | −5.5673E−11 | 7.5273E−13 | −4.5595E−15 | 0.0000E+00 |
| S16 | 4.0806E−07 | −1.9041E−08 | 6.1537E−10 | −1.3105E−11 | 1.6543E−13 | −9.3775E−16 | 0.0000E+00 |

Figure 8A:
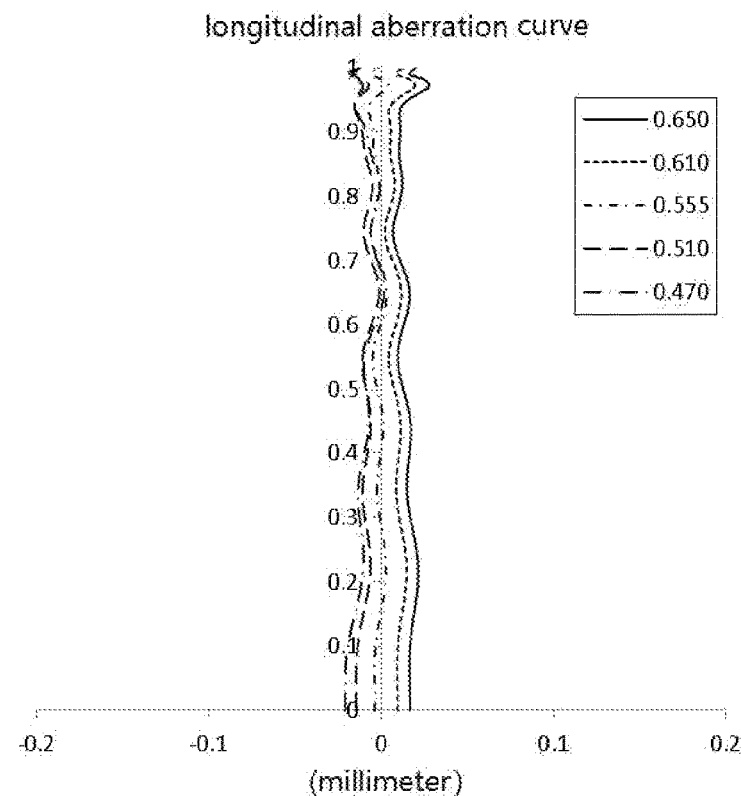
FIGS. 8A-8D respectively show a longitudinal aberration curve, an astigmatism curve, a distortion curve and a lateral color curve of the optical imaging system according to Embodiment 4.
Figure 8B:
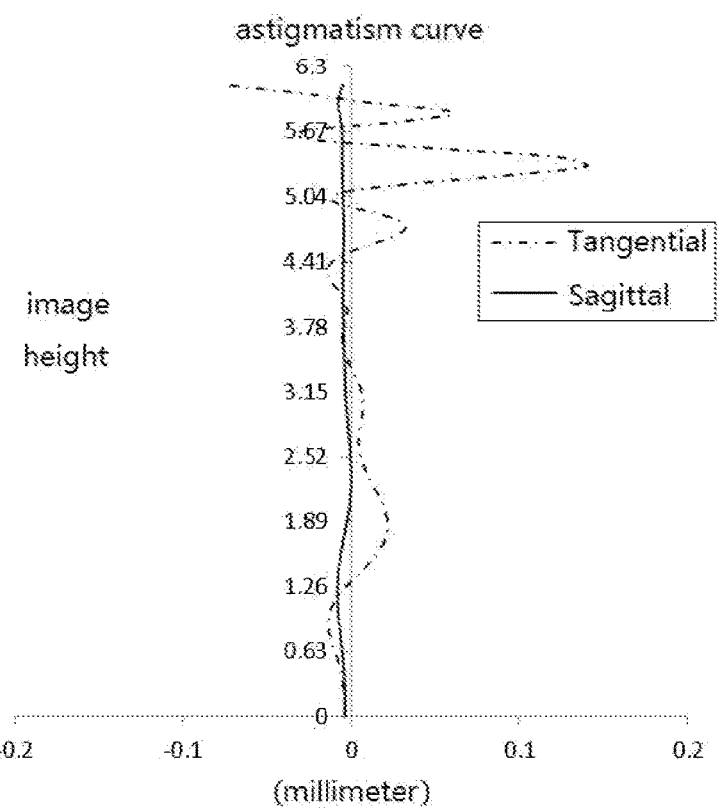
Figure 8C:
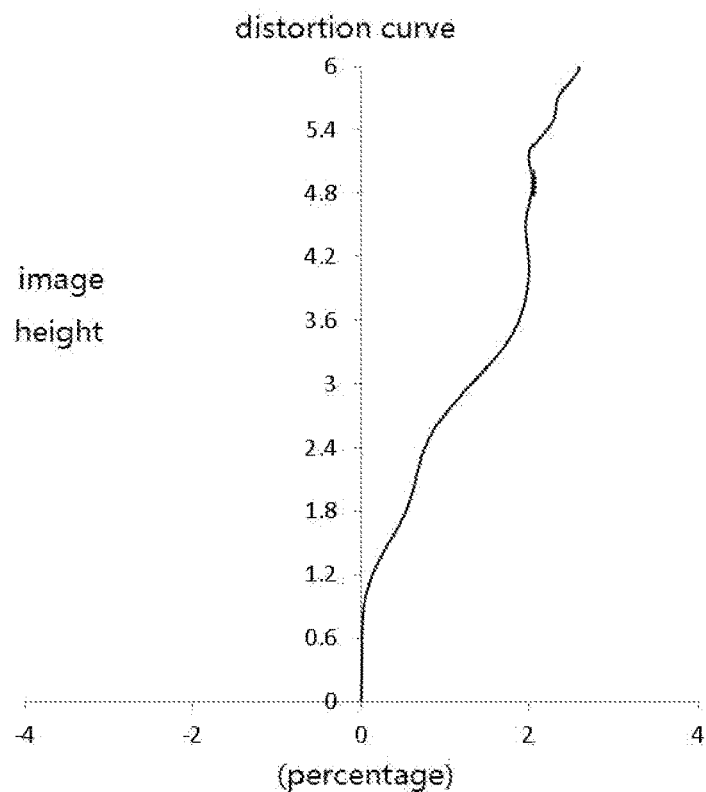
Figure 8D:
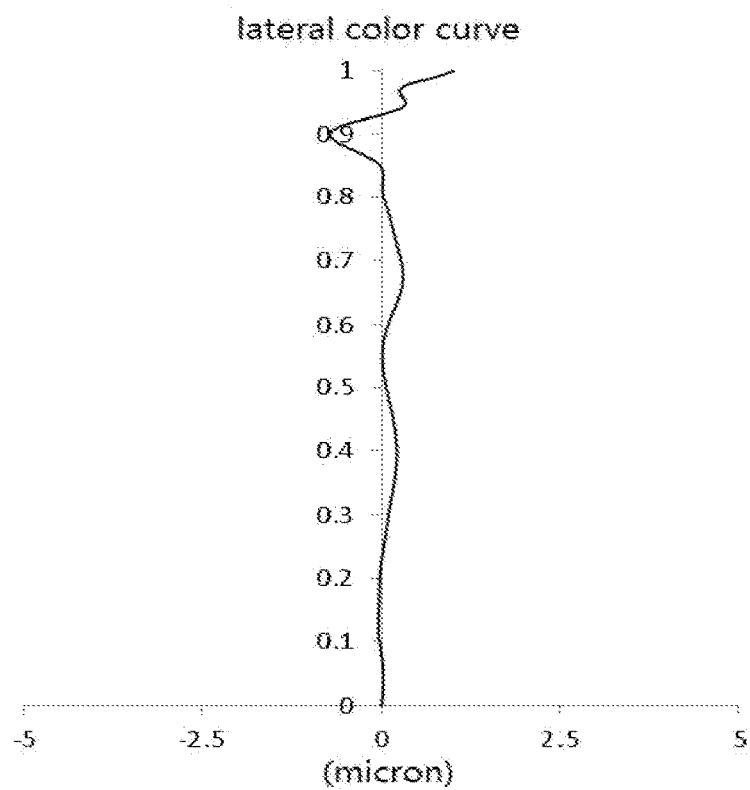

FIG. 8A shows a longitudinal aberration curve of the optical imaging system in Embodiment 4, which represents that a converging focus of light with different wavelengths deviates after passing through the system. FIG. 8B shows an astigmatism curve of the optical imaging system in Embodiment 4, which represents a meridian image surface curvature and a sagittal image surface curvature. FIG. 8C shows a distortion curve of the optical imaging system in Embodiment 4, which represents distortion values at different image heights. FIG. 8D shows a lateral color curve of the optical imaging system in Embodiment 4, which represents the aberration of different image heights on the imaging surface after the light passes through the system. It can be seen from FIG. 8A to FIG. 8D that the optical imaging system provided by Embodiment 4 can achieve good imaging quality.

Embodiment 5

Figure 9:
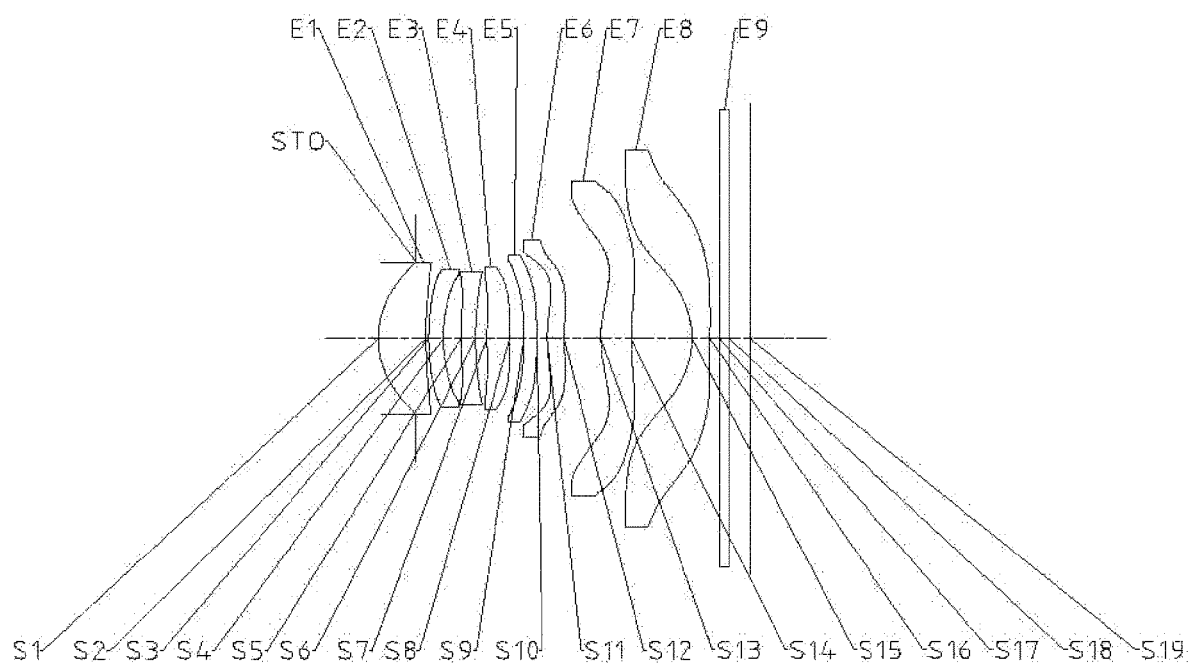
FIG. 9 shows a structure diagram of an optical imaging system according to Embodiment 5 of the disclosure.

An optical imaging system according to Embodiment 5 of the disclosure will be described below with reference to FIG. 9 to FIG. 10D. FIG. 9 shows a structure diagram of the optical imaging system according to Embodiment 5 of the disclosure.

As shown in FIG. 9, the optical imaging system sequentially includes a diaphragm STO, a first lens E1, a second lens E2, a third lens E3, a fourth lens E4, a fifth lens E5, a sixth lens E6, a seventh lens E7, an eighth lens E8 and an optical filter E9 from an object side to an image side along an optical axis.

The first lens E1 has positive refractive power; an object-side surface S1 of the first lens is a convex surface; and an image-side surface S2 of the first lens is a concave surface. The second lens E2 has negative refractive power; an object-side surface S3 of the second lens is a convex surface; and an image-side surface S4 of the second lens is a concave surface. The third lens E3 has negative refractive power; an object-side surface S5 of the third lens is a convex surface; and an image-side surface S6 of the third lens is a concave surface. The fourth lens E4 has positive refractive power; an object-side surface S7 of the fourth lens is a convex surface; and an image-side surface S8 of the fourth lens is a convex surface. The fifth lens E5 has negative refractive power; an object-side surface S9 of the fifth lens is a concave surface; and an image-side surface S10 of the fifth lens is a convex surface. The sixth lens E6 has positive refractive power; an object-side surface S11 of the sixth lens is a convex surface; and an image-side surface S12 of the sixth lens is a concave surface. The seventh lens E7 has positive refractive power; an object-side surface S13 of the seventh lens is a convex surface; and an image-side surface S14 of the seventh lens is a concave surface. The eighth lens E8 has a negative refractive power; an object-side surface S15 of the eighth lens is a concave surface; and an image-side surface S16 of the eighth lens is a concave surface. The optical filter E9 has an object-side surface S17 and an image-side surface S18. The optical imaging system has an imaging surface S19; and light from an object sequentially penetrates through the surfaces S1 to S18 and is finally imaged on the imaging surface S19.

In Embodiment 5, the total effective focal length f of the optical imaging system is 6.70 mm; the F number Fno of the optical imaging system is 1.69; TTL is the distance from the object-side surface S1 of the first lens E1 to the imaging surface S19 on the optical axis, TTL is 7.82 mm; ImgH is the half of a diagonal length of an effective pixel region on the imaging surface S19, ImgH is 6.21 mm; and the Semi-FOV is a half of the maximum field of view, Semi-FOV is 42.1°.

Table 9 shows a list of basic parameters of the optical imaging system in Embodiment 5, in which the units of curvature radius, thickness/distance and focal length are millimetre (mm). Table 10 shows high-order coefficients applicable to each aspherical mirror surface in Embodiment 5, wherein each aspherical surface type can be defined by the formula (1) given in Embodiment 1.

TABLE 9

| | | | | Material | | | |
|---|---|---|---|---|---|---|---|
| Surface number | Surface type | Curvature radius | Thickness/ distance | Refractive index | Abbe number | Focal length | Conic coefficient |
| OBJ | Spherical | Infinite | Infinite | | | | |
| STO | Spherical | Infinite | −0.8022 | | | | |
| S1 | Aspherical | 2.7596 | 1.0000 | 1.55 | 56.1 | 6.28 | 1.9852 |
| S2 | Aspherical | 12.3325 | 0.0604 | | | | 1.9097 |
| S3 | Aspherical | 7.1446 | 0.3000 | 1.67 | 19.2 | −19.59 | 1.8106 |
| S4 | Aspherical | 4.5660 | 0.3803 | | | | 1.6349 |
| S5 | Aspherical | 10.9262 | 0.3000 | 1.67 | 20.4 | −39.40 | 1.6200 |
| S6 | Aspherical | 7.6310 | 0.2383 | | | | 1.7219 |
| S7 | Aspherical | 22.4303 | 0.4874 | 1.55 | 56.1 | 28.68 | 1.7604 |
| S8 | Aspherical | −51.4635 | 0.2935 | | | | 1.8650 |
| S9 | Aspherical | −8.3588 | 0.2683 | 1.67 | 20.4 | −34.66 | 2.0264 |
| S10 | Aspherical | −13.2671 | 0.2209 | | | | 2.1969 |
| S11 | Aspherical | 4.8458 | 0.3543 | 1.57 | 38.0 | 21.20 | 2.2687 |
| S12 | Aspherical | 7.8719 | 0.7852 | | | | 2.5781 |
| S13 | Aspherical | 4.5406 | 0.6343 | 1.55 | 56.1 | 10.77 | 3.7608 |
| S14 | Aspherical | 18.9826 | 1.2838 | | | | 4.1424 |
| S15 | Aspherical | −2.5739 | 0.3700 | 1.54 | 55.9 | −4.48 | 4.7170 |
| S16 | Aspherical | 38.4367 | 0.2022 | | | | 4.9639 |

TABLE 9-continued

| Surface number | Surface type | Curvature radius | Thickness/ distance | Material Refractive index | Abbe number | Focal length | Conic coefficient |
|---|---|---|---|---|---|---|---|
| S17 | Spherical | Infinite | 0.2100 | 1.52 | 64.2 | | |
| S18 | Spherical | Infinite | 0.4311 | | | | |
| S19 | Spherical | Infinite | | | | | |

TABLE 10

| Surface number | A4 | A6 | A8 | A10 | A12 | A1 | A16 |
|---|---|---|---|---|---|---|---|
| S1 | −3.3361E−03 | 1.6903E−02 | −5.3124E−02 | 1.0970E−01 | −1.5634E−01 | 1.5816E−01 | −1.1540E−01 |
| S2 | −1.1248E−02 | 1.0468E−02 | −1.7638E−02 | 2.7837E−02 | −3.5874E−02 | 3.9729E−02 | −3.6377E−02 |
| S3 | −1.1073E−02 | 8.1254E−03 | −9.0672E−03 | 7.4157E−03 | −5.7462E−03 | 2.1573E−02 | −4.8131E−02 |
| S4 | −2.6669E−03 | 1.1850E−02 | −9.0946E−02 | 3.6296E−01 | −8.8982E−01 | 1.4508E+00 | −1.6395E+00 |
| S5 | −1.1673E−02 | −3.0524E−02 | 1.8074E−01 | −7.2232E−01 | 1.8498E+00 | −3.1799E+00 | 3.7903E+00 |
| S6 | −7.2756E−03 | −2.2964E−02 | 7.7180E−02 | −1.7038E−01 | 2.4689E−01 | −2.3477E−01 | 1.3855E−01 |
| S7 | −1.3100E−02 | 1.1036E−02 | −5.2893E−02 | 1.3634E−01 | −2.3219E−01 | 2.7366E−01 | −2.2951E−01 |
| S8 | −1.0032E−02 | 2.1182E−02 | −1.5600E−01 | 4.5559E−01 | −8.3706E−01 | 1.0502E+00 | −9.3315E−01 |
| S9 | 3.4996E−02 | −2.9530E−02 | −5.9313E−02 | 2.0044E−01 | −3.0631E−01 | 2.9803E−01 | −1.9948E−01 |
| S10 | 2.7687E−02 | −5.8340E−02 | 6.0700E−02 | −5.1630E−02 | 3.7611E−02 | −2.5179E−02 | 1.5357E−02 |
| S11 | −3.0381E−02 | −6.2102E−02 | 1.7444E−01 | −2.8607E−01 | 3.1772E−01 | −2.4970E−01 | 1.4137E−01 |
| S12 | −3.2975E−02 | −3.2499E−02 | 1.0035E−01 | −1.5325E−01 | 1.5134E−01 | −1.0285E−01 | 4.9341E−02 |
| S13 | −8.4543E−03 | −8.2529E−03 | 4.1835E−03 | −2.0751E−03 | 7.6154E−04 | −1.8096E−04 | 2.7493E−05 |
| S14 | 1.5781E−02 | −1.0281E−02 | 2.5757E−03 | −7.3796E−04 | 2.3570E−04 | −5.2091E−05 | 7.0407E−06 |
| S15 | −1.8310E−02 | 9.3524E−03 | −6.8127E−03 | 2.8793E−03 | −7.1002E−04 | 1.1301E−04 | −1.2251E−05 |
| S16 | −1.6601E−02 | 8.8666E−03 | −4.7115E−03 | 1.5232E−03 | −3.1332E−04 | 4.3637E−05 | −4.2711E−06 |
| Surface number | A18 | A20 | A22 | A24 | A26 | A28 | A30 |
| S1 | 6.1098E−02 | −2.3409E−02 | 6.4072E−03 | −1.2187E−03 | 1.5278E−04 | −1.1334E−05 | 3.7644E−07 |
| S2 | 2.5574E−02 | −1.3130E−02 | 4.7743E−03 | −1.1914E−03 | 1.9372E−04 | −1.8471E−05 | 7.8342E−07 |
| S3 | 5.7291E−02 | −4.1578E−02 | 1.9484E−02 | −5.9530E−03 | 1.1491E−03 | −1.2751E−04 | 6.2091E−06 |
| S4 | 1.3135E+00 | −7.5185E−01 | 3.0552E−01 | −8.6086E−02 | 1.5990E−02 | −1.7607E−03 | 8.7049E−05 |
| S5 | −3.1930E+00 | 1.9142E+00 | −8.1156E−01 | 2.3777E−01 | −4.5794E−02 | 5.2164E−03 | −2.6630E−04 |
| S6 | −3.7721E−02 | −1.0195E−02 | 1.4254E−02 | −6.3009E−03 | 1.5177E−03 | −1.9897E−04 | 1.1167E−05 |
| S7 | 1.3843E−01 | −5.9993E−02 | 1.8494E−02 | −3.9634E−03 | 5.6385E−04 | −4.8210E−05 | 1.8900E−06 |
| S8 | 5.9713E−01 | −2.7614E−01 | 9.1431E−02 | −2.1129E−02 | 3.2354E−03 | −2.9487E−04 | 1.2104E−05 |
| S9 | 9.4479E−02 | −3.1873E−02 | 7.5907E−03 | −1.2433E−03 | 1.3283E−04 | −8.2964E−06 | 2.2831E−07 |
| S10 | −7.7540E−03 | 2.9694E−03 | −8.1652E−04 | 1.5436E−04 | −1.8940E−05 | 1.3542E−06 | −4.1778E−08 |
| S11 | −5.8155E−02 | 1.7376E−02 | −3.7303E−03 | 5.6070E−04 | −5.6031E−05 | 3.3451E−06 | −9.0305E−08 |
| S12 | −1.6910E−02 | 4.1453E−03 | −7.1932E−04 | 8.6121E−05 | −6.7578E−06 | 3.1253E−07 | −6.4551E−09 |
| S13 | −2.6424E−06 | 1.5228E−07 | −4.2934E−09 | −1.0307E−11 | 3.6877E−12 | −5.3602E−14 | −4.4467E−16 |
| S14 | −5.5691E−07 | 2.1424E−08 | 1.2697E−10 | −4.8877E−11 | 1.8725E−12 | −2.4458E−14 | 0.0000E+00 |
| S15 | 9.2530E−07 | −4.8775E−08 | 1.7614E−09 | −4.1575E−11 | 5.7817E−13 | −3.5948E−15 | 0.0000E+00 |
| S16 | 2.9802E−07 | −1.4753E−08 | 5.0587E−10 | −1.1412E−11 | 1.5221E−13 | −9.0859E−16 | 0.0000E+00 |

Figure 10A:
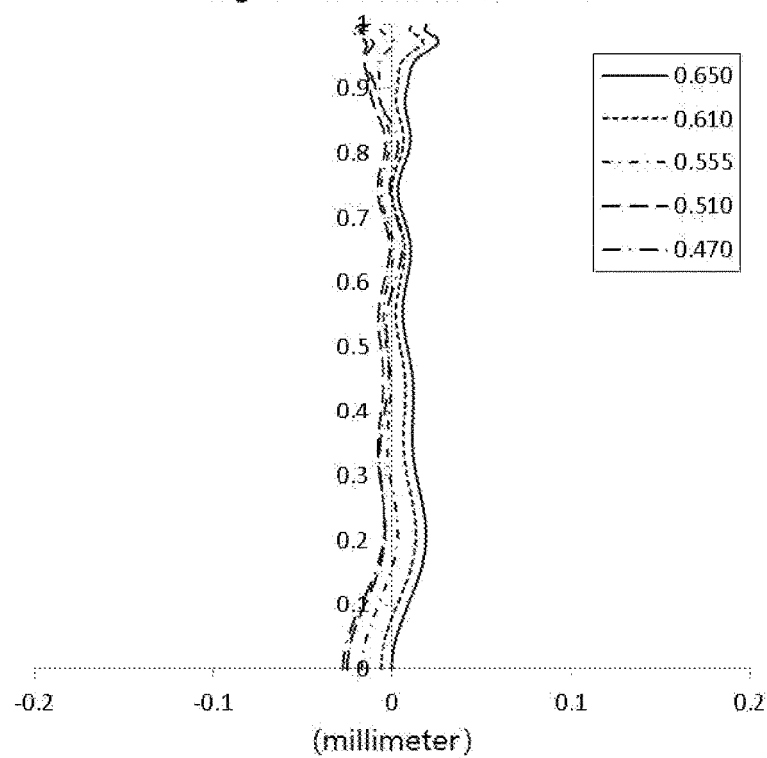
FIGS. 10A-10D respectively show a longitudinal aberration curve, an astigmatism curve, a distortion curve and a lateral color curve of the optical imaging system according to Embodiment 5.
Figure 10B:
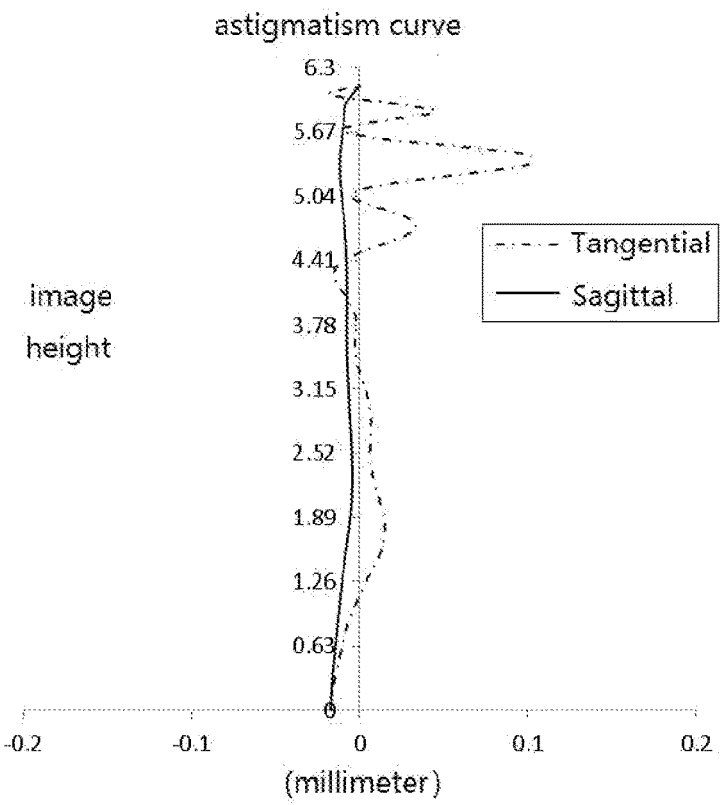
Figure 10C:
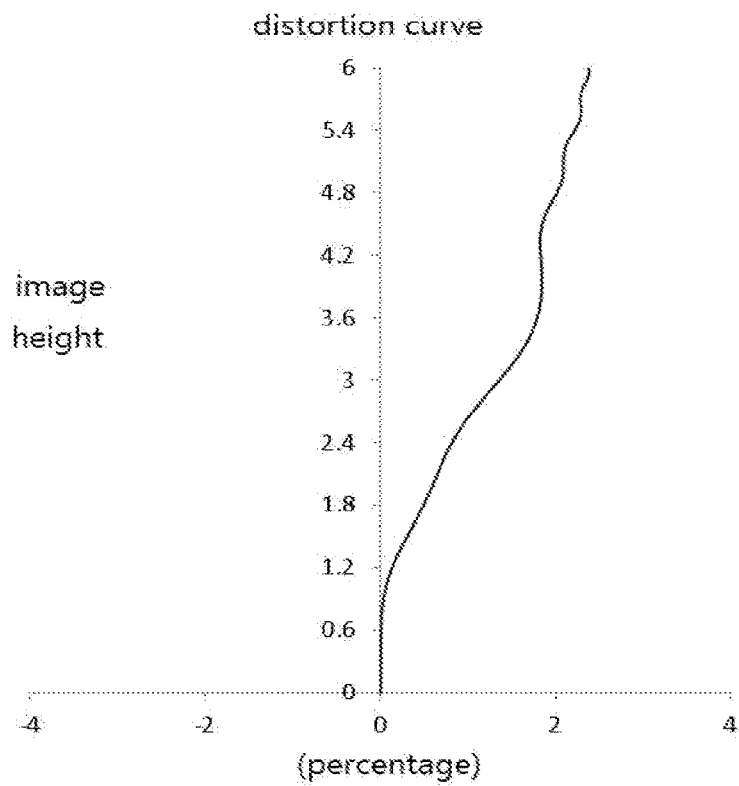
Figure 10D:
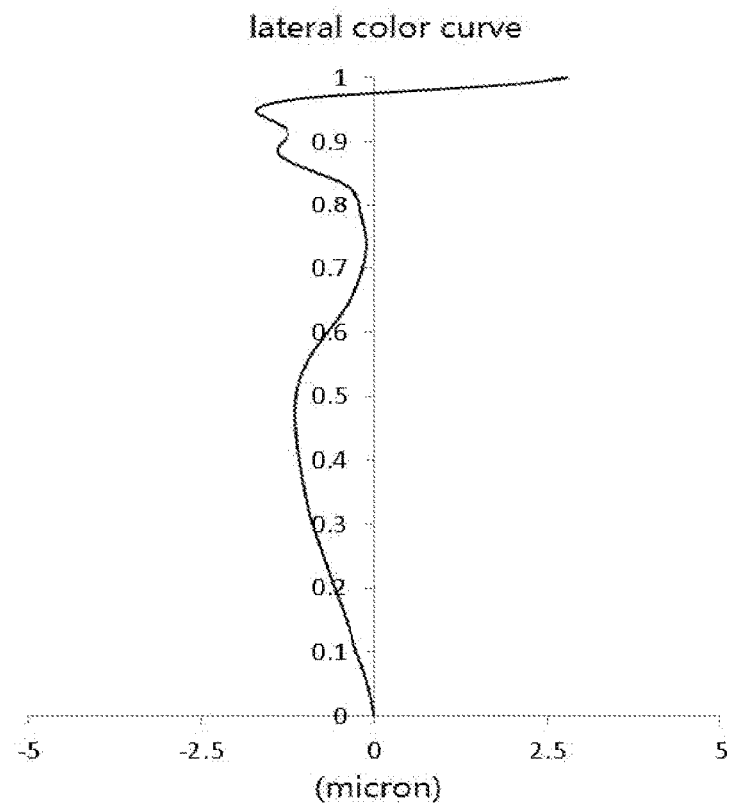

FIG. 10A shows a longitudinal aberration curve of the optical imaging system in Embodiment 5, which represents that a converging focus of light with different wavelengths deviates after passing through the system. FIG. 10B shows an astigmatism curve of the optical imaging system in Embodiment 5, which represents a meridian image surface curvature and a sagittal image surface curvature. FIG. 10C shows a distortion curve of the optical imaging system in Embodiment 5, which represents distortion values at different image heights. FIG. 10D shows a lateral color curve of the optical imaging system in Embodiment 5, which represents the aberration of different image heights on the imaging surface after the light passes through the system. It can be seen from FIG. 10A to FIG. 10D that the optical imaging system provided by Embodiment 5 can achieve good imaging quality.

Embodiment 6

Figure 11:
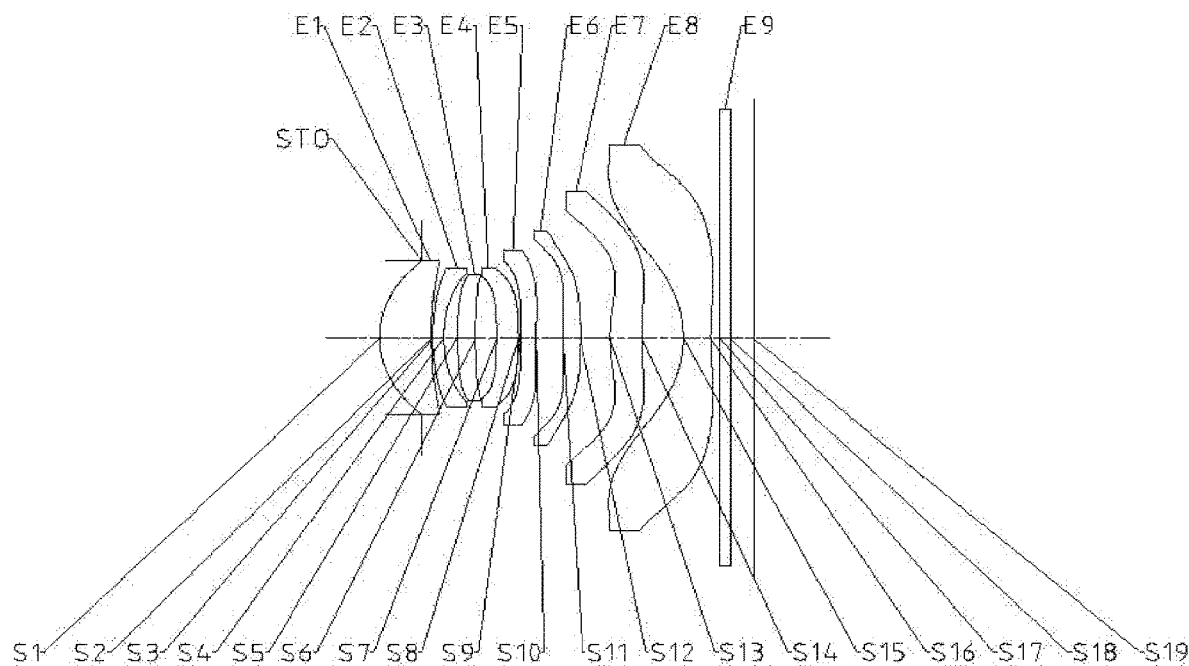
FIG. 11 shows a structure diagram of an optical imaging system according to Embodiment 6 of the disclosure.

An optical imaging system according to Embodiment 6 of the disclosure will be described below with reference to FIG. 11 to FIG. 12D. FIG. 11 shows a structure diagram of the optical imaging system according to Embodiment 6 of the disclosure.

As shown in FIG. 11, the optical imaging system sequentially includes a diaphragm STO, a first lens E1, a second lens E2, a third lens E3, a fourth lens E4, a fifth lens E5, a sixth lens E6, a seventh lens E7, an eighth lens E8 and an optical filter E9 from an object side to an image side along an optical axis.

The first lens E1 has positive refractive power; an object-side surface S1 of the first lens is a convex surface; and an image-side surface S2 of the first lens is a concave surface. The second lens E2 has negative refractive power; an object-side surface S3 of the second lens is a convex surface; and an image-side surface S4 of the second lens is a concave surface. The third lens E3 has positive refractive power; an object-side surface S5 of the third lens is a convex surface; and an image-side surface S6 of the third lens is a concave surface. The fourth lens E4 has positive refractive power; an object-side surface S7 of the fourth lens is a concave surface; and an image-side surface S8 of the fourth lens is a convex surface. The fifth lens E5 has negative refractive power; an object-side surface S9 of the fifth lens is a convex surface; and an image-side surface S10 of the fifth lens is a concave surface. The sixth lens E6 has positive refractive power; an object-side surface S11 of the sixth lens is a convex surface; and an image-side surface S12 of the sixth lens is a convex surface. The seventh lens E7 has positive refractive power; an object-side surface S13 of the seventh lens is a convex surface; and an image-side surface S14 of the seventh lens is a concave surface. The eighth lens E8 has a negative refractive power; an object-side surface S15 of the eighth lens is a concave surface; and an image-side surface S16 of the eighth lens is a concave surface. The optical filter E9 has an object-side surface S17 and an image-side surface S18. The optical imaging system has an imaging surface S19; and light from an object sequentially penetrates through the surfaces S1 to S18 and is finally imaged on the imaging surface S19.

In Embodiment 6, the total effective focal length f of the optical imaging system is 6.74 mm; the F number Fno of the optical imaging system is 1.70; TTL is the distance from the object-side surface S1 of the first lens E1 to the imaging surface S19 on the optical axis, TTL is 7.83 mm; ImgH is the half of a diagonal length of an effective pixel region on the imaging surface S19, ImgH is 6.21 mm; and the Semi-FOV is a half of the maximum field of view, Semi-FOV is 41.9°.

Table 11 shows a list of basic parameters of the optical imaging system in Embodiment 6, in which the units of curvature radius, thickness/distance and focal length are millimetre (mm). Table 12 shows high-order coefficients applicable to each aspherical mirror surface in Embodiment 6, wherein each aspherical surface type can be defined by the formula (1) given in Embodiment 1.

TABLE 11

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.8717 | | | | |
| S1 | Aspherical | 2.6361 | 1.0806 | 1.55 | 56.1 | 6.14 | 1.9871 |
| S2 | Aspherical | 10.5492 | 0.0287 | | | | 1.8735 |
| S3 | Aspherical | 5.4219 | 0.2320 | 1.67 | 19.2 | −14.08 | 1.8093 |
| S4 | Aspherical | 3.3977 | 0.2756 | | | | 1.6611 |
| S5 | Aspherical | 7.7604 | 0.3883 | 1.67 | 20.4 | 33.99 | 1.6476 |
| S6 | Aspherical | 13.1039 | 0.4446 | | | | 1.5772 |
| S7 | Aspherical | −16.4659 | 0.4583 | 1.55 | 56.1 | 40.14 | 1.5893 |
| S8 | Aspherical | −9.6746 | 0.0401 | | | | 1.8119 |
| S9 | Aspherical | 50.0047 | 0.3244 | 1.67 | 20.4 | −25.62 | 1.9587 |
| S10 | Aspherical | 12.8512 | 0.5628 | | | | 2.2702 |
| S11 | Aspherical | 26.4458 | 0.3688 | 1.57 | 38.0 | 19.44 | 2.5477 |
| S12 | Aspherical | −19.0052 | 0.6261 | | | | 2.7988 |
| S13 | Aspherical | 5.3530 | 0.6669 | 1.55 | 56.1 | 12.67 | 3.3036 |
| S14 | Aspherical | 22.6111 | 0.8710 | | | | 3.7973 |
| S15 | Aspherical | −3.3536 | 0.5663 | 1.54 | 55.9 | −4.47 | 4.5797 |
| S16 | Aspherical | 8.9048 | 0.1989 | | | | 5.0329 |
| S17 | Spherical | Infinite | 0.2100 | 1.52 | 64.2 | | |
| S18 | Spherical | Infinite | 0.4865 | | | | |
| S19 | Spherical | Infinite | | | | | |

TABLE 12

| Surface number | A4 | A6 | A8 | A10 | A12 | A14 | A16 |
|---|---|---|---|---|---|---|---|
| S1 | −2.5058E−03 | 1.7169E−02 | −5.7343E−02 | 1.2126E−01 | −1.7604E−01 | 1.8258E−01 | −1.3788E−01 |
| S2 | −4.4342E−02 | 2.6133E−01 | −9.1120E−01 | 2.0304E+00 | −3.0676E+00 | 3.2719E+00 | −2.5224E+00 |
| S3 | −5.5109E−02 | 2.8288E−01 | −1.0431E+00 | 2.5116E+00 | −4.1090E+00 | 4.7359E+00 | −3.9303E+00 |
| S4 | −1.2657E−02 | 1.2827E−03 | 1.8084E−01 | −9.9691E−01 | 2.8402E+00 | −5.0561E+00 | 6.0619E+00 |
| S5 | −2.0700E−03 | −1.7568E−02 | 2.6682E−02 | 2.8330E−02 | −1.7559E−01 | 3.0248E−01 | −2.6057E−01 |
| S6 | −3.9644E−03 | 1.4288E−02 | −1.1405E−01 | 4.7207E−01 | −1.2549E+00 | 2.2749E+00 | −2.8881E+00 |
| S7 | −4.4606E−03 | −6.5997E−02 | 2.9804E−01 | −9.9467E−01 | 2.2383E+00 | −3.5495E+00 | 4.0712E+00 |
| S8 | 2.9789E−02 | −1.4289E−01 | 3.0211E−01 | −4.2709E−01 | 3.5996E−01 | −1.2736E−01 | −8.0447E−02 |
| S9 | 2.0884E−03 | −1.2907E−01 | 3.1585E−01 | −5.0239E−01 | 5.6267E−01 | −4.5889E−01 | 2.7586E−01 |
| S10 | −2.4923E−02 | −2.5251E−02 | 6.3418E−02 | −8.5543E−02 | 8.2089E−02 | −5.9056E−02 | 3.2115E−02 |
| S11 | 3.7862E−03 | −2.3012E−02 | 1.3853E−02 | 9.1077E−03 | −9.4695E−03 | 9.2081E−03 | −5.3124E−03 |
| S12 | −5.3170E−04 | −2.2492E−02 | 1.6134E−02 | −5.9037E−03 | 1.1726E−03 | −2.6315E−04 | 1.5856E−04 |
| S13 | 2.9808E−03 | −2.2910E−02 | 1.4238E−02 | −9.5011E−03 | 5.4577E−03 | −2.2274E−03 | 6.2296E−04 |
| S14 | 2.5652E−02 | −1.7629E−02 | 2.4359E−03 | 3.6009E−04 | −6.2797E−05 | −5.8749E−05 | 2.6956E−05 |
| S15 | 2.0802E−03 | −1.6524E−03 | −2.2484E−03 | 1.6470E−03 | −4.9337E−04 | 8.6720E−05 | −9.9456E−06 |
| S16 | −2.0577E−02 | 6.5877E−03 | −3.3027E−03 | 1.2217E−03 | −2.8956E−04 | 4.5553E−05 | −4.9220E−06 |

| Surface number | A18 | A20 | A22 | A24 | A26 | A28 | A30 |
|---|---|---|---|---|---|---|---|
| S1 | 7.6255E−02 | −3.0764E−02 | 8.9241E−03 | −1.8085E−03 | 2.4263E−04 | −1.9338E−05 | 6.9268E−07 |
| S2 | 1.4202E+00 | −5.8360E−01 | 1.7290E−01 | −3.5916E−02 | 4.9584E−03 | −4.0823E−04 | 1.5156E−05 |
| S3 | 2.3730E+00 | −1.0423E+00 | 3.2931E−01 | −7.2845E−02 | 1.0701E−02 | −9.3738E−04 | 3.7037E−05 |

TABLE 12-continued

| | | | | | | | |
|---|---|---|---|---|---|---|---|
| S4 | −5.0731E+00 | 3.0059E+00 | −1.2575E+00 | 3.6362E−01 | −6.9182E−02 | 7.7953E−03 | −3.9421E−04 |
| S5 | 9.1175E−02 | 3.7296E−02 | −5.8626E−02 | 3.0390E−02 | −8.4663E−03 | 1.2645E−03 | −7.9764E−05 |
| S6 | 2.6028E+00 | −1.6695E+00 | 7.5527E−01 | −2.3504E−01 | 4.7801E−02 | −5.7109E−03 | 3.0346E−04 |
| S7 | −3.4181E+00 | 2.1008E+00 | −9.3400E−01 | 2.9210E−01 | −6.0895E−02 | 7.5907E−03 | −4.2766E−04 |
| S8 | 1.4125E−01 | −9.7257E−02 | 4.0728E−02 | −1.1061E−02 | 1.9117E−03 | −1.9182E−04 | 8.5273E−06 |
| S9 | −1.2205E−01 | 3.9293E−02 | −9.0038E−03 | 1.4133E−03 | −1.4195E−04 | 7.9906E−06 | −1.8129E−07 |
| S10 | −1.3107E−02 | 3.9596E−03 | −8.6734E−04 | 1.3336E−04 | −1.3605E−05 | 8.2472E−07 | −2.2430E−08 |
| S11 | 2.1093E−03 | −5.9569E−04 | 1.1936E−04 | −1.6556E−05 | 1.5093E−06 | −8.1201E−08 | 1.9506E−09 |
| S12 | −7.2002E−05 | 1.8995E−05 | −3.0291E−06 | 2.9097E−07 | −1.5552E−08 | 3.5593E−10 | 0.0000E+00 |
| S13 | −1.1944E−04 | 1.5653E−05 | −1.3763E−06 | 7.7557E−08 | −2.5299E−09 | 3.6307E−11 | 0.0000E+00 |
| S14 | −5.5633E−06 | 6.8045E−07 | −5.2170E−08 | 2.4677E−09 | −6.5978E−11 | 7.6388E−13 | 0.0000E+00 |
| S15 | 7.7608E−07 | −4.1667E−08 | 1.5190E−09 | −3.5993E−11 | 5.0085E−13 | −3.1106E−15 | 0.0000E+00 |
| S16 | 3.7097E−07 | −1.9469E−08 | 6.9679E−10 | −1.6203E−11 | 2.2051E−13 | −1.3321E−15 | 0.0000E+00 |

Figure 12A:
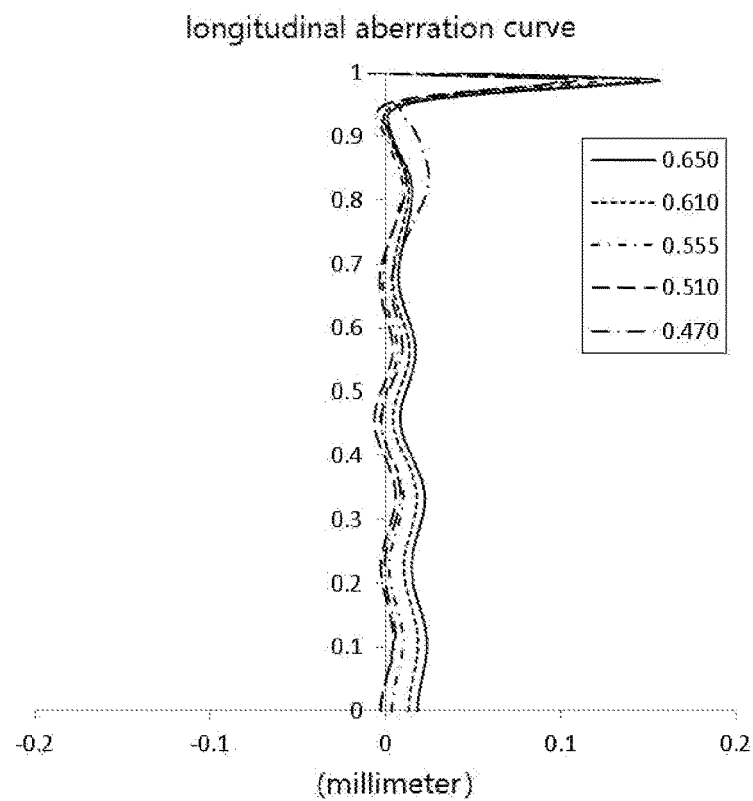
FIGS. 12A-12D respectively show a longitudinal aberration curve, an astigmatism curve, a distortion curve and a lateral color curve of the optical imaging system according to Embodiment 6.
Figure 12B:
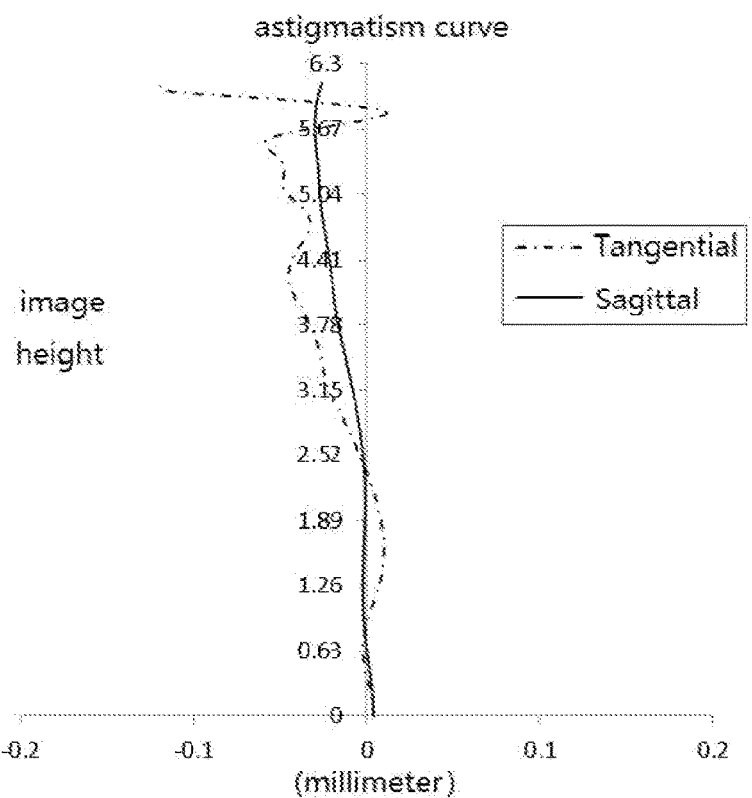
Figure 12C:
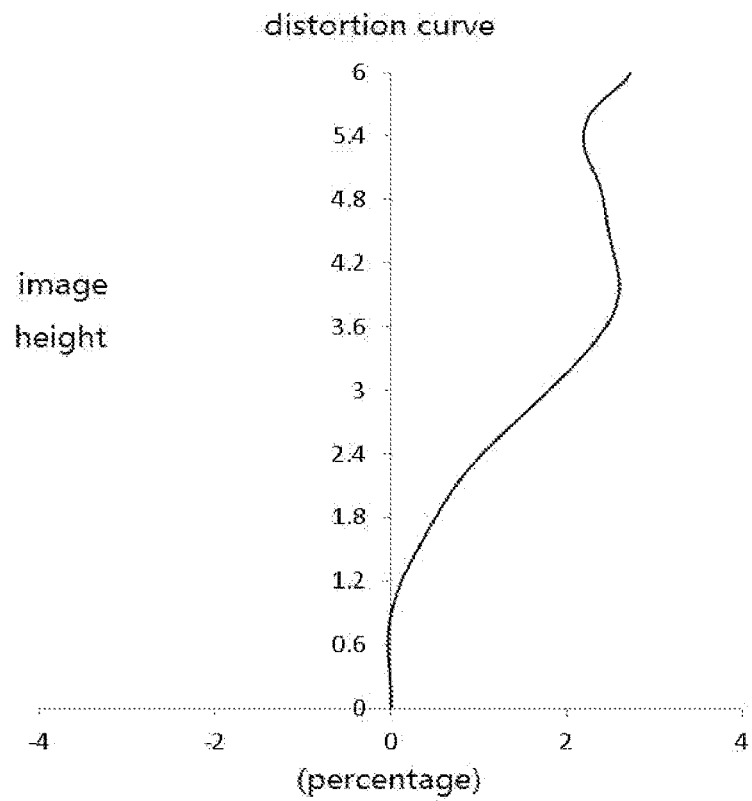
Figure 12D:
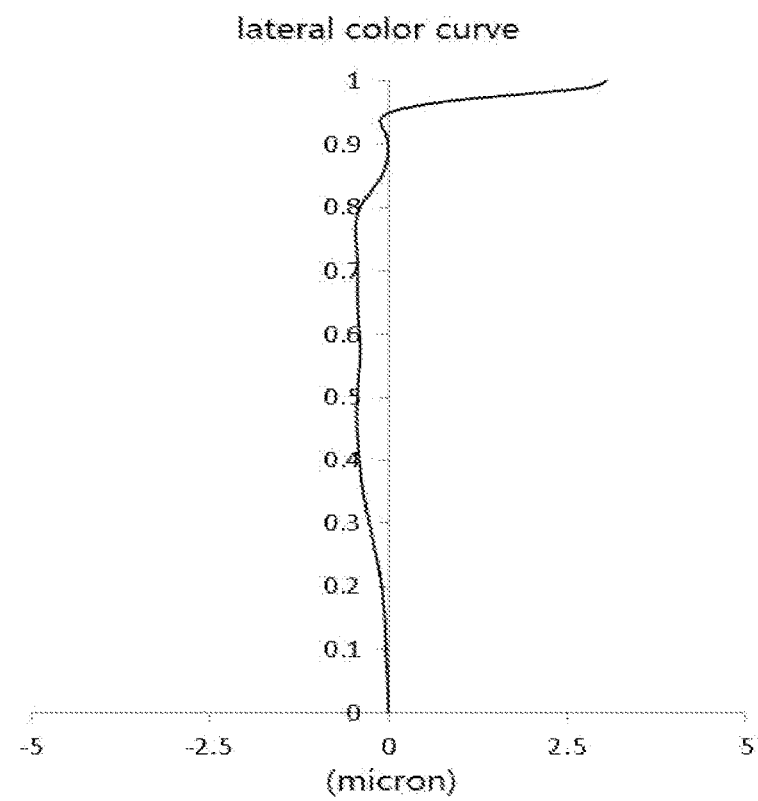

FIG. 12A shows a longitudinal aberration curve of the optical imaging system in Embodiment 6, which represents that a converging focus of light with different wavelengths deviates after passing through the system. FIG. 12B shows an astigmatism curve of the optical imaging system in Embodiment 6, which represents a meridian image surface curvature and a sagittal image surface curvature. FIG. 12C shows a distortion curve of the optical imaging system in Embodiment 6, which represents distortion values at different image heights. FIG. 12D shows a lateral color curve of the optical imaging system in Embodiment 6, which represents the aberration of different image heights on the imaging surface after the light passes through the system. It can be seen from FIG. 12A to FIG. 12D that the optical imaging system provided by Embodiment 6 can achieve good imaging quality.

In summary, Embodiments 1 to 6 meet the relationship shown in Table 13, respectively.

TABLE 13

| | Conditional expression/Embodiment | | | | | |
|---|---|---|---|---|---|---|
| | 1 | 2 | 3 | 4 | 5 | 6 |
| TTL/ImgH | 1.26 | 1.26 | 1.26 | 1.26 | 1.26 | 1.26 |
| f/EPD | 1.69 | 1.69 | 1.69 | 1.69 | 1.69 | 1.70 |
| R15/f8 | 0.58 | 0.58 | 0.57 | 0.57 | 0.57 | 0.75 |
| SAG61/SAG72 | 0.72 | 0.87 | 0.66 | 0.56 | 0.62 | 0.51 |
| T78/SAG81 | −1.03 | −1.05 | −1.01 | −1.03 | −0.98 | −0.58 |
| SAG42/CT4 | −0.83 | −0.82 | −0.62 | −0.79 | −0.61 | −1.10 |
| ET7/(ET3 + ET6) | 0.69 | 0.63 | 0.62 | 0.67 | 0.63 | 0.85 |
| f78/f23 | 0.78 | 1.38 | 1.05 | 0.77 | 0.84 | 0.36 |
| (f8 − f7)/(f2 − f1) | 0.74 | 0.64 | 0.56 | 0.66 | 0.59 | 0.85 |
| f/(R2 − R1) | 0.68 | 0.69 | 0.65 | 0.57 | 0.70 | 0.85 |
| R4/R3 | 0.44 | 0.39 | 0.63 | 0.60 | 0.64 | 0.63 |
| R11/|R12| | 0.72 | 1.15 | 1.01 | 0.44 | 0.62 | 1.39 |
| ((R5 + R6)/(R13 + R14) | 0.38 | 0.37 | 0.76 | 0.65 | 0.79 | 0.75 |
| R9/(R9 + R10) | 0.28 | 0.33 | 0.54 | 0.65 | 0.39 | 0.80 |
| T67/CT1 | 0.66 | 0.44 | 0.73 | 0.83 | 0.79 | 0.58 |
| (CT2 + CT3 + CT5)/(CT6 + CT7 + CT8) | 0.63 | 0.62 | 0.67 | 0.63 | 0.64 | 0.59 |
| (T12 + T23)/(T34 + T45 + T56) | 0.24 | 0.21 | 0.58 | 0.52 | 0.59 | 0.29 |

The disclosure also provides an imaging device, which is provided with an electronic photosensitive element for imaging, wherein the electronic photosensitive element may be a charge coupled device (CCD) or a complementary metal oxide semiconductor (CMOS). The imaging device may be an independent imaging device such as a digital camera, or an imaging module integrated on a mobile electronic device such as a mobile phone. The imaging device is equipped with the optical imaging system described above.

The above are only preferred embodiments of the disclosure and explanations of the applied technical principles. Those skilled in the art should know that the protection scope involved in the disclosure is not limited to the technical solutions formed by a specific combination of the above technical characteristics, but also covers other technical solutions formed by any combination of the above technical characteristics or their equivalent characteristics without departing from the concept of the disclosure, for example, the technical solution formed by replacing the above characteristics with the technical characteristics with similar functions disclosed in (but not limited to) the disclosure.

What is claimed is:

1. An optical imaging system, sequentially comprising a first lens, a second lens, a third lens, a fourth lens, a fifth lens, a sixth lens, a seventh lens and an eighth lens from an object side to an image side along an optical axis, wherein an image-side surface of the seventh lens is a concave surface;

the optical imaging system meets the following conditional expressions:

$TTL/ImgH<1.3$, $f/EPD<1.8$, $ImgH>6$ mm and $0<R15/f8<0.8$, wherein TTL is a distance from an object-side surface of the first lens to an imaging surface of the optical imaging system on the optical axis; ImgH is a half of diagonal length of an effective pixel region on the imaging surface; f is a total effective focal length of the optical imaging system; EPD is an entrance pupil diameter of the optical imaging system; R15 is a curvature radius of an object-side surface of the eighth lens; and f8 is an effective focal length of the eighth lens;

the optical imaging system meets a conditional expression: $0.5<(f8-f7)/(f2-f1)<1.0$, wherein f1 is an effective focal length of the first lens; f2 is an effective focal length of the second lens; f7 is an effective focal length of the seventh lens; and f8 is an effective focal length of the eighth lens.

2. The optical imaging system as claimed in claim 1, wherein the optical imaging system meets a conditional expression: $0.4<SAG61/SAG72<1.0$, wherein SAG61 is an on-axis distance from an intersection point of an object-side surface of the sixth lens and the optical axis to an effective radius vertex of the object-side surface of the sixth lens on the optical axis;

and SAG72 is an on-axis distance from an intersection point of the image-side surface of the seventh lens and the optical axis to an effective radius vertex of the image-side surface of the seventh lens on the optical axis.

3. The optical imaging system as claimed in claim 1, wherein the optical imaging system meets a conditional expression: −1.5<T78/SAG81<−0.5,
wherein T78 is a separation distance between the seventh lens and the eighth lens on the optical axis; and SAG81 is an on-axis distance from an intersection point of the object-side surface of the eighth lens and the optical axis to an effective radius vertex of the object-side surface of the eighth lens on the optical axis.

4. The optical imaging system as claimed in claim 1, wherein the optical imaging system meets a conditional expression: −1.5<SAG42/CT4<−0.5,
wherein SAG42 is an on-axis distance from an intersection point of an image-side surface of the fourth lens and the optical axis to an effective radius vertex of the image-side surface of the fourth lens on the optical axis; and CT4 is a central thickness of the fourth lens on the optical axis.

5. The optical imaging system as claimed in claim 1, wherein the optical imaging system meets a conditional expression: 0.5<ET7/(ET3−ET6)<1.0,
wherein ET3 is an edge thickness of the third lens; ET6 is an edge thickness of the sixth lens; and ET7 is an edge thickness of the seventh lens.

6. The optical imaging system as claimed in claim 1, wherein the optical imaging system meets a conditional expression: 0.3<f78/f23<1.5,
wherein f23 is a combined focal length of the second lens and the third lens; and f78 is a combined focal length of the seventh lens and the eighth lens.

7. The optical imaging system as claimed in claim 1, wherein the first lens has positive refractive power; the second lens has negative refractive power; the seventh lens has positive refractive power; and the eighth lens has negative refractive power.

8. The optical imaging system as claimed in claim 1, wherein the object-side surface of the first lens is a convex surface; and the image-side surface of the first lens is a concave surface.

9. The optical imaging system as claimed in claim 1, wherein the optical imaging system meets a conditional expression: 0.5<f/(R2−R1)<1.0,
wherein f is a total effective focal length of the optical imaging system; R1 is a curvature radius of the object-side surface of the first lens; and R2 is a curvature radius of an image-side surface of the first lens.

10. The optical imaging system as claimed in claim 1, wherein an object-side surface of the second lens is a convex surface; and an image-side surface of the second lens is a concave surface.

11. The optical imaging system as claimed in claim 1, wherein the optical imaging system meets a conditional expression: 0.3<R4/R3<0.8,
wherein R3 is a curvature radius of an object-side surface of the second lens; and R4 is a curvature radius of an image-side surface of the second lens.

12. The optical imaging system as claimed in claim 1, wherein an object-side surface of the sixth lens is a convex surface; and 0.3<R11/|R12|<1.5,
wherein R11 is a curvature radius of the object-side surface of the sixth lens, and R12 is a curvature radius of an image-side surface of the sixth lens.

13. The optical imaging system as claimed in claim 1, wherein
an object-side surface of the third lens is a convex surface, and an image-side surface of the third lens is a concave surface; and an object-side surface of the seventh lens is a convex surface.

14. The optical imaging system as claimed in claim 1, wherein the optical imaging system meets a conditional expression: 0.3<(R5+R6)/(R13+R14)<1.0,
wherein R5 is a curvature radius of an object-side surface of the third lens; R6 is a curvature radius of an image-side surface of the third lens; R13 is a curvature radius of an object-side surface of the seventh lens; and R14 is a curvature radius of the image-side surface of the seventh lens.

15. The optical imaging system as claimed in claim 1, wherein the optical imaging system meets a conditional expression: 0.2<R9/(R9+R10)<0.9,
wherein R9 is a curvature radius of an object-side surface of the fifth lens; and R10 is a curvature radius of an image-side surface of the fifth lens.

16. The optical imaging system as claimed in claim 1, wherein the optical imaging system meets a conditional expression: 0.4<T67/CT1<1.0,
wherein T67 is a separation distance between the sixth lens and the seventh lens on the optical axis; and CT1 is a central thickness of the first lens on the optical axis.

17. The optical imaging system as claimed in claim 1, wherein the optical imaging system meets a conditional expression: 0.3<(CT2+CT3+CT5)/(CT6+CT7+CT8)<0.8,
wherein CT2 is a central thickness of the second lens on the optical axis; CT3 is a central thickness of the third lens on the optical axis; CT5 is a central thickness of the fifth lens on the optical axis; CT6 is a central thickness of the sixth lens on the optical axis; CT7 is a central thickness of the seventh lens on the optical axis; and CT8 is a central thickness of the eighth lens on the optical axis.

18. The optical imaging system as claimed in claim 1, wherein the optical imaging system meets a conditional expression: 0.2<(T12+T23)/(T34+T45+T56)<0.7,
wherein T12 is a separation distance between the first lens and the second lens on the optical axis; T23 is a separation distance between the second lens and the third lens on the optical axis; T34 is a separation distance between the third lens and the fourth lens on the optical axis; T45 is a separation distance between the fourth lens and the fifth lens on the optical axis; and T56 is a separation distance between the fifth lens and the sixth lens on the optical axis.

19. The optical imaging system as claimed in claim 1, wherein an object-side surface of the eighth lens is a concave surface; and an image-side surface of the eighth lens is a concave surface.

* * * * *